US012371229B2

(12) United States Patent
Bailey et al.

(10) Patent No.: US 12,371,229 B2
(45) Date of Patent: Jul. 29, 2025

(54) THERMOPLASTIC BAG WITH FIBER-REINFORCED TOP

(71) Applicant: THE GLAD PRODUCTS COMPANY, Oakland, CA (US)

(72) Inventors: David A. Bailey, Cincinnati, OH (US); Shaun T. Broering, Fort Thomas, KY (US); Edward B. Tucker, Yorkville, IL (US)

(73) Assignee: THE GLAD PRODUCTS COMPANY, Oakland, CA (US)

( * ) Notice: Subject to any disclaimer, the term of this patent is extended or adjusted under 35 U.S.C. 154(b) by 133 days.

(21) Appl. No.: 18/298,664

(22) Filed: Apr. 11, 2023

(65) Prior Publication Data

US 2023/0356887 A1 Nov. 9, 2023

Related U.S. Application Data

(60) Provisional application No. 63/364,236, filed on May 5, 2022.

(51) Int. Cl.

| | |
|---|---|
| ***B65D 33/02*** | (2006.01) |
| ***B65D 33/28*** | (2006.01) |
| ***B65D 75/26*** | (2006.01) |
| ***B65D 75/38*** | (2006.01) |
| ***B65D 77/04*** | (2006.01) |
| ***B65F 1/00*** | (2006.01) |

(52) U.S. Cl.

CPC ............. *B65D 33/02* (2013.01); *B65D 33/28* (2013.01); *B65D 75/26* (2013.01); *B65D 75/38* (2013.01); *B65D 77/04* (2013.01); *B65F 1/002* (2013.01); *B65F 2250/114* (2013.01)

(58) Field of Classification Search

CPC ........ B65D 33/02; B65D 33/28; B65D 75/26; B65D 75/38; B65D 77/04; B65F 1/002; B65F 1/225; B65F 1/114

USPC ............................................ 383/75, 109, 119

See application file for complete search history.

(56) References Cited

U.S. PATENT DOCUMENTS 2,714,571 A 8/1955 Irion et al.
3,322,613 A 5/1967 Rasmussen
(Continued)

FOREIGN PATENT DOCUMENTS

JP 2008545598 A * 12/2008

*Primary Examiner* — Jes F Pascua
(74) *Attorney, Agent, or Firm* — Keller Preece PLLC

(57) ABSTRACT

The present disclosure relates to a fiber reinforced thermoplastic bag (e.g., comprising a bag-in-bag). In one or more embodiments, the reinforced thermoplastic bag includes a plurality of fibers reinforcing a top-of-bag area where users often apply an external force to lift or carry the reinforced thermoplastic bag. In certain embodiments, the plurality of fibers is positioned across at least a portion of a grab-zone. Additionally or alternatively, the plurality of fibers reinforces a hem channel region. In particular embodiments, the plurality of fibers is positioned in between bag layers. For example, the plurality of fibers is sandwiched between an inner layer and an outer layer. In certain implementations, the plurality of fibers between layers is bonded to a particular layer, but not necessarily both layers. Additionally, the plurality of fibers can impart a variety of mechanical benefits. Further, the plurality of fibers is visually identifiable through one or both layers.

17 Claims, 18 Drawing Sheets

(56) References Cited

U.S. PATENT DOCUMENTS

| | | | | |
|---|---|---|---|---|
| 3,592,379 | A * | 7/1971 | Nakamura | A45C 3/04 383/38 |
| 4,522,203 | A | 6/1985 | Mays | |
| 4,753,840 | A | 6/1988 | Van Gompel | |
| 6,561,696 | B1 | 5/2003 | Rusnak et al. | |
| 8,603,609 | B2 | 12/2013 | Fraser et al. | |
| 9,925,745 | B2 * | 3/2018 | Jean-Mary | B32B 7/02 |
| 11,807,422 | B2 * | 11/2023 | Tucker | B32B 27/12 |
| 2005/0175805 | A1 * | 8/2005 | Hild | B32B 37/153 428/36.1 |

* cited by examiner

1200

| | 1 | 2 | 3 | 3a | 4 | 5 | 6 | 7 | 8 | 9 | 10 | 11 | 12 |
|---|---|---|---|---|---|---|---|---|---|---|---|---|---|
| Type | core/sheath | core/steath eccentric | side by side full | side by side full | side by side hollow | side by side hollow eccentric | orange type with center 16 segments | orange type w/o center 16 segments | striped fibers | conductive fibers | island in the sea | profile bico | mixed fibers |
| | 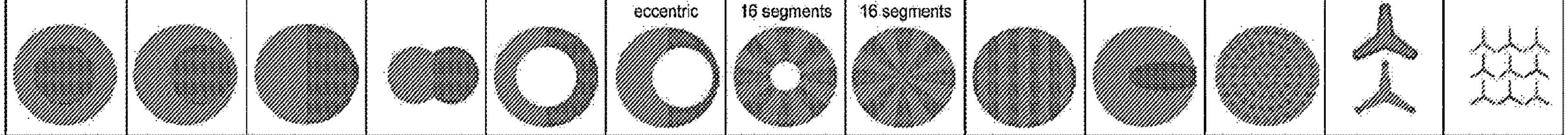 | | | | | | | | | | | | |
| Materials | RPET / PET<br>PET / CoPET<br>PET / PE<br>PP / PP<br>PP / PE | RPET / PET<br>PP / PE<br>PP / PP<br>PET / CoPET | PET / PET<br>PET/PTT<br>PP / PE<br>PP / PP<br>PET / CoPET<br>R-PET / R-PET<br>PET / PE | PET / PET<br>PET/PTT<br>PP / PE<br>PP / PP<br>PET / CoPET<br>R-PET / R-PET<br>PET / PE | PET / PET<br>PP / PE<br>PP / PP<br>PET / PE | PET / PET<br>PP / PE<br>PP / PP<br>PE / PE | PET / PA6<br>PET / PA6.6<br>PET / CoPET | PET / PA6<br>PET / PA6.6<br>PET / CoPET | PET / PA6 | PA6 / MB | PA6 / CoPET<br>PET / CoPET | PP / PA6<br>PA6 / PA6<br>PET / R-PET<br>PTT / PET | PET / PET<br>PP / PP<br>PA6 / PA6<br>PA 6.6 / PA 6.6<br>PET / CoPET |
| Final titer [dtex] | 1.7 - 20 | 1.7 - 20 | 2 - 20 | 2 - 20 | 2 - 20 | 2 - 20 | 0.1 - 0.2 | 0.1 - 0.2 | 0.1 - 0.2 | 25 - 30 undrawn | < 0.05 | 15-20 | |
| Ratio [%/%] | 30/70 - 80/20<br>90/10 | 30/70 - 70/30 | 50/50 | 50/50 | 50/50 - 70/30 | 30/70 - 70/30 | 50/50<br>65/35 | 50/50<br>65/35<br>80/20 | 50/50<br>70/30 | 50/50<br>70/30 | 80/20<br>50/50<br>70/30 | 50/50<br>30/70 | |

* different colors, different materials, different dtex, different profiles: Possible products, variety depending on the end-use

Fig. 12

THERMOPLASTIC BAG WITH FIBER-REINFORCED TOP

CROSS-REFERENCE TO RELATED APPLICATIONS

This application claims priority to, and the benefit of, U.S. Provisional Patent Application No. 63/364,236, filed on May 5, 2022, which is incorporated herein by reference in its entirety.

BACKGROUND

Among their many applications, thermoplastic bags are used as liners in trash or refuse receptacles. Such liners can be found at many locations from small household kitchen garbage cans to larger, multi-gallon drums located in public places and restaurants. Bags that are intended to be used as liners for such refuse containers are typically made from low-cost, pliable thermoplastic material. When the receptacle is full, the thermoplastic liner holding the trash can be removed for disposal and replaced with a new liner.

Increasing manufacturing costs for thermoplastic liners have led to a trending effort to decrease material usage (e.g., by making thinner webs). As a result, some conventional thermoplastic liners are prone to tearing, ruptures, and other issues at the top of the bag. For example, when grabbing conventional thermoplastic liners by a drawstring to pull the thermoplastic liner up and out of a trash receptacle, the weight of the trash combined with the upwards pulling force from the drawstring can cause a conventional thermoplastic liner to tear near the hem channel. Similarly, for instance, when grasping a conventional thermoplastic liner by a top portion, a grasping hand (e.g., fingers) can puncture or overly stretch (leading to subsequent failure of) the thermoplastic liner. In turn, such compromising of the top of the bag can lead to trash spillage, require an adjusted/awkward carrying position or method, etc. (e.g., when transporting a full trash bag from a house trash receptacle to a curbside trash can).

For some conventional thermoplastic liners, the decrease in material can also trigger undesirable visual cues (e.g., that less material is used and therefore the thermoplastic liner must be weak or cheaply made). Regardless of actual material properties, these conventional thermoplastic liners can visually convey material properties that are contrary to consumer preferences—thereby leading to a consumer perception of low durability and strength.

BRIEF SUMMARY

Aspects of the present disclosure relate to visible and tactile fiber reinforcement of a thermoplastic bag that provide increased film mechanical performance and enhanced consumer perception of strength. In particular, one or more implementations of a reinforced thermoplastic bag include a reinforcing application of polymer fibers at a top-of-bag region to strengthen corresponding areas, such as a grab-zone where users grasp when lifting or carrying the reinforced thermoplastic bag. Additionally, or alternatively, application of the polymer fibers reinforce areas of the top-of-bag region, such as a hem channel, a hem skirt, a hem hole, etc. Further, the polymer fibers can span various distances or areas between side edges of the bag—including zones of polymer fibers arranged in various patterns, densities, and configurations. The polymer fibers can also be applied to one or more films of single-ply or multi-ply thermoplastic bags. For example, the polymer fibers can be applied to an innermost film on the inside of the bag, an outermost film on the outside of the bag, and/or between films. In a particular embodiment, the polymer fibers are bonded to a first film and enclosed by a second film such that the polymer fibers are entrapped between film layers of a multi-layered bag.

In addition to the foregoing, a method for forming a reinforced thermoplastic bag may include applying material in fiber form via a spray system or a carding process. For example, in one or more embodiments, a method for forming a reinforced thermoplastic bag includes spraying a plurality of polymer fibers across a thermoplastic film at a top-of-bag region (e.g., via melt-blown extrusion, spun bond, or hot melt spray). In addition, forming the reinforced thermoplastic bag can include non-continuously laminating portions and/or layers of the reinforced thermoplastic bag together. In one or more implementations, the plurality of polymer fibers is non-continuously laminated to portions of the reinforced thermoplastic bag. Further, the method can include joining respective side edges of first and second sidewalls to form a bag configuration. The method can additionally include forming a bottom fold or a closed bottom edge to join the first and second sidewalls at a bottom portion of the reinforced thermoplastic bag.

Additional features and advantages of one or more embodiments of the present disclosure are outlined in the following description.

BRIEF DESCRIPTION OF THE DRAWINGS

The detailed description provides one or more embodiments with additional specificity and detail through the use of the accompanying drawings, as briefly described below.

FIG. 12 illustrates a table indicating various example configurations of hot melt bi-component spray nozzle configurations that can produce corresponding fiber cross-sections of certain material compositions in accordance with one or more embodiments.

DETAILED DESCRIPTION

Figure 1A:
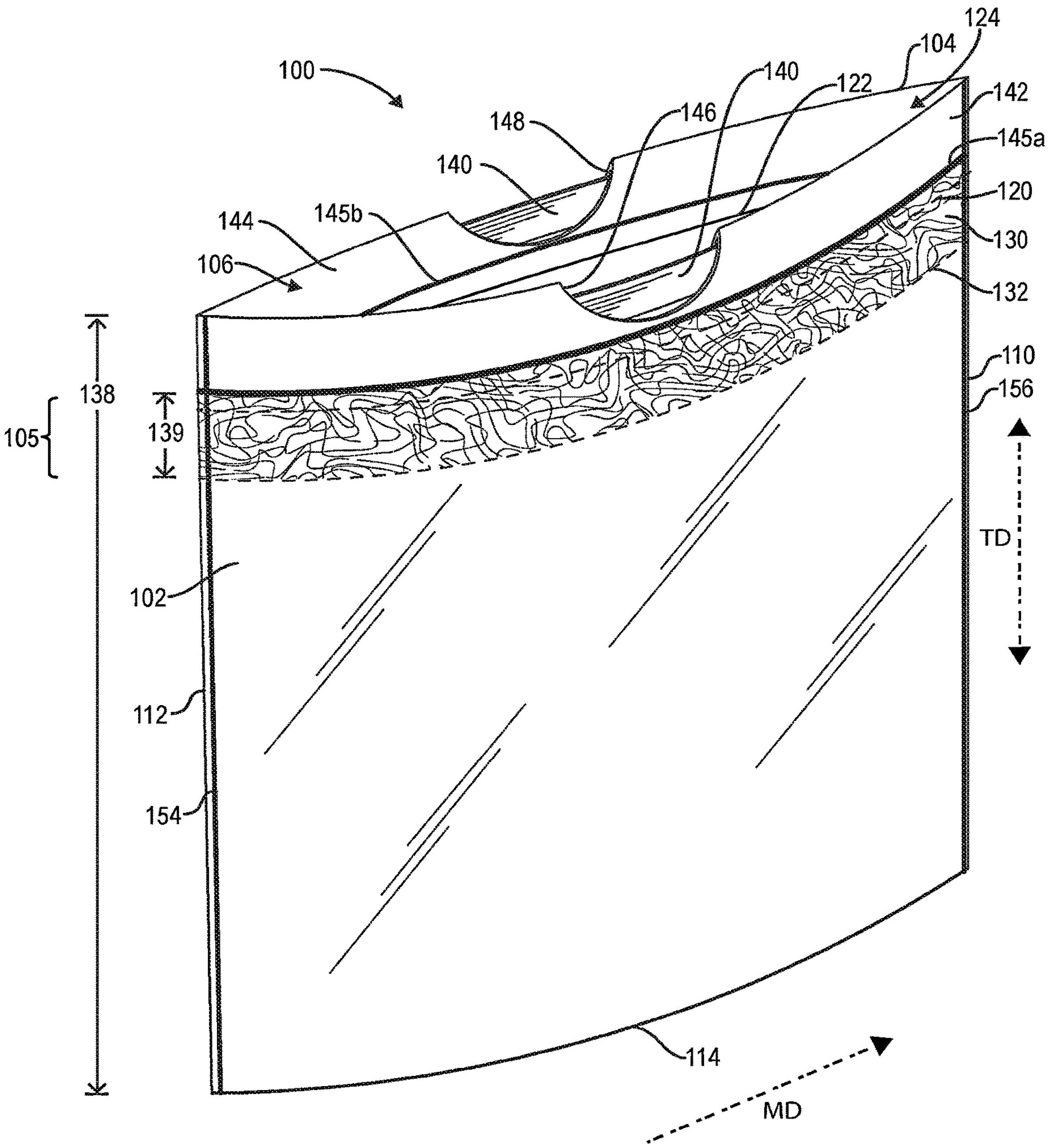
FIGS. 1A-1B illustrate respective reinforced thermoplastic bags in accordance with one or more embodiments.

This disclosure describes one or more embodiments of a reinforced thermoplastic bag with fiber reinforcement to provide increased mechanical performance and enhanced consumer perception of strength. In particular, the reinforced thermoplastic bag can include a selective application of polymer fibers to different zones or in patterns at different add-on (density) levels to provide reinforcement to the thermoplastic bag. The area of fiber application can include a zone that spans across a total width of the reinforced thermoplastic bag (from side seal to side seal) or across a portion of the width. In certain embodiments, the area of fiber application includes a grab-zone just below a hem seal where the reinforced thermoplastic bag is commonly grasped during lifting or transporting. In further embodiments, the area of fiber application can include a hem channel, the grab-zone, and/or a hem skirt. In certain implementations, the area of fiber application includes a non-rectangular or irregular pattern, such as a wavy pattern that enhances strength specifically where the region is widest (e.g., at a wave crest). In one or more embodiments, the area of fiber application includes discrete areas away from side seals (e.g., to reinforce a hem hole or central region of the bag). In at least one embodiment, the area of fiber application excludes areas associated with sealing, such as side seals and hem seals (e.g., to avoid sealing complications).

In particular embodiments, the reinforced thermoplastic bag comprises fiber reinforcement between plies (e.g., of a 2-ply bag). For example, in one embodiment, a plurality of fibers extends from below a hem seal a distance towards a bottom fold of the reinforced thermoplastic bag. In another embodiment, the plurality of fibers extends upward through the hem seal, around a hem channel, and back through the hem seal along a hem skirt.

In one or more embodiments, the plurality of fibers reinforces a top-of-bag region, but at areas exclusively below the hem seal. For example, in at least one embodiment, the plurality of fibers extends from a first side edge to an opposing second side edge (e.g., an entire width of bag). In certain implementations, the plurality of fibers extends from the first side edge to the opposing second side edge, but in various patterns. For example, the plurality of fibers is arranged in a wave pattern such that a central region of the reinforced thermoplastic bag includes a greater number of fibers compared to the first side edge and the opposing second side edge. In other embodiments, the plurality of fibers does not extend an entire distance between the first side edge and the opposing second side edge. For instance, in certain implementations, the reinforced thermoplastic bag comprises areas adjacent to the first side edge and the opposing second side edge that are devoid of fibers.

In certain embodiments, the plurality of fibers reinforces the top-of-bag region at areas above and below a hem seal. For example, in one or more embodiments, the plurality of fibers spans an entire distance between the first side edge and the opposing second side edge, and from a distance below the hem seal all the way up to the top edge of the bag. In another example embodiment, the plurality of fibers is concentrated around a hem hole. For instance, the plurality of fibers covers a central portion of a hem and a central portion of the reinforced thermoplastic bag below the hem seal.

In one or more embodiments, the reinforced thermoplastic bag utilizes a plurality of fibers comprising one or more of polymers, hot melt adhesives, or pressure sensitive adhesives. From these types of fibers, the plurality of fibers can include a single fiber material, multiple different fiber materials, or individual fibers comprising multiple components (e.g., bi-component fibers). Similarly, the plurality of fibers can include uniform or mixed fiber sizes and/or fiber densities. In addition, the plurality of fibers can include a random form structure or one or more predetermined form structures or patterns (e.g., grid-like structures, zipper-like structures, etc.).

Moreover, the plurality of fibers can impart a variety of mechanical, manufacturing, consumer, and/or sustainability advantages. For example, in one or more embodiments, the reinforced thermoplastic bag comprises a plurality of fibers that reduces or minimizes an amount of additional material for reinforcing one or more bag films. For instance, by applying the plurality of fibers, the reinforced thermoplastic bag comprises a fiber-reinforced area of considerably less material (e.g., basis weight in grams/square meter) than the film itself. In this manner, the reinforced thermoplastic bag can be reinforced without adding film layers or without materially increasing a gauge or thickness of the film layers.

Similarly, the plurality of fibers can be selectively added in different zones or in patterns at different add-on levels to increase effectiveness. This flexibility to selectively apply reinforcement is typically unavailable for conventional reinforcement processes (e.g., that implement additional film layers). Accordingly, utilizing the plurality of fibers can provide a manufacturing advantage by flexibly limiting reinforcement to the desired areas—thereby improving material efficiency and reducing material consumption.

In addition, the plurality of fibers can include one or more different materials. For example, in certain implementations, the plurality of fibers includes multiple different materials or a blended mix of resin materials to allow for different properties. For instance, one or more fibers of the plurality of fibers can include a lower melting point polymer to assist bonding to the base bag film. Additionally, one or more other fibers of the plurality of fibers can include a polymer material that provides stiffness via an enhanced modulus and/or higher density. Also, the plurality of fibers can comprise color differentiated fiber strands that correspondingly provide a functional contribution to benefits associated with trash bags, such as strength, odor control, post-consumer reclaimed content, etc.

Further, the plurality of fibers can provide, via visible and/or tactile means, increased consumer perception of strength and durability (e.g., at the grab-zone of the reinforced thermoplastic bag). In these or other embodiments, one or more layers of the reinforced thermoplastic bag are translucent or lightly pigmented to facilitate visibility of colored fibers. For example, when superimposing a translucent outer layer over colored fibers, the reinforced thermoplastic bag can visibly show that the fibrous region is a reinforced area.

Additionally, it will be appreciated that the plurality of fibers can include various sizes, including fiber sizes optimized for visual distinction (e.g., to be readily seen by the naked eye). Similarly, to promote visual distinction and/or mechanical strength, the plurality of fibers can be arranged in various densities (e.g., high density fibrous regions interspersed within low density fibrous regions). Likewise, the plurality of fibers can be arranged in a gradient fashion by gradually increasing or decreasing a basis weight of fibers across a film surface.

In certain embodiments, the plurality of fibers provides discontinuous lamination between plies of a multi-ply bag. In particular, the plurality of fibers can provide various levels of degrees of bonding. To illustrate, the plurality of fibers can provide a peelable bond such that the plurality of fibers is tacked lightly onto a film. Alternatively, the plurality of fibers can provide a fused bond such that the plurality of fibers is melted and thermally welded to the film. In at least one embodiment, the plurality of fibers is bonded to one or more plies via heat, pressure, or other bonding techniques.

In one or more embodiments, the plurality of fibers provides visible reinforcement without bonding together plies in a multi-ply bag. For example, in particular embodiments, the plurality of fibers is allowed to cool after applying to a first film and prior to positioning a second film onto the first film. In this manner, the plurality of fibers only bonds to the first film—not the second film. As another example, the plurality of fibers is cooled from a molten state to a flexible, fibrous mat prior to applying to a film. In this case, the plurality of fibers (as a fibrous mat) can be inserted between films and subsequently anchored at a certain position by way of heat seals, embossing, SELFing, or other techniques. In other embodiments, the plurality of fibers (even in a molten state) is chemically incompatible with the film such that no bonding affinity exists between the plurality of fibers and one or more films of the reinforced thermoplastic bag. In the case of an incompatible fiber/film composition, the plurality of fibers can be mechanically secured to a film to similarly create an anchored position between films.

Still further, the plurality of fibers of a reinforced thermoplastic bag can provide other benefits. For example, the plurality of fibers can improve tensile strength, reduce or prevent tears, or slow punctures. In certain cases, the plurality of fibers can help hide visible effects from deformation, strain, or damage to the reinforced thermoplastic bag. Additionally, or alternatively, the plurality of fibers can reduce localized strain.

As illustrated by the foregoing discussion, the present disclosure utilizes a variety of terms to describe features and benefits of a reinforced thermoplastic bag. Additional detail is now provided regarding the meaning of these terms. For example, as used herein, the term "fiber" refers to a strand or filament of material, such as a polymer material. In particular embodiments, a fiber includes a strand of material for forming one or more discontinuous structures, whether random or regularized (e.g., patterned). In certain embodiments, a fiber includes a single material. In other embodiments, a fiber includes multiple materials, such as a first fiber material encapsulated by a sheath comprising a second fiber material. Example fiber materials are provided below.

Additionally, as used herein, the term "grab-zone" refers to a portion of a thermoplastic bag that is subjected to an applied load (e.g., stretching or poking from grasping fingers, a lifting force to lift or carry the thermoplastic bag, etc.). In particular, the grab-zone includes a top portion of a thermoplastic bag (e.g., below a hem seal). For example, the grab-zone extends from a first side edge to an opposing second side edge and from the hem seal a first distance toward the bottom fold. In other embodiments without a drawstring or hem seal, the grab-zone extends from a first side edge to an opposing second side edge and from proximate (e.g., immediately adjacent to or within a threshold distance from) the top opening a second distance toward the bottom fold.

As used herein, the terms "lamination," "laminate," and "laminated film," refer to the process and resulting product made by bonding together two or more layers of film or other material. The term laminate is also inclusive of coextruded multilayer films comprising one or more tie layers. The term "bonding," when used in reference to bonding of multiple layers may be used interchangeably with "lamination" of the layers. As a verb, "laminate" means to affix or adhere (by means of, for example, adhesive bonding, pressure bonding (e.g., ring rolling, embossing, SELFing, bond forming due to tackifying agents in one or more of the films), ultrasonic bonding, corona lamination, and the like) two or more separately made film articles to one another so as to form a multi-layer structure. For example, a means of sealing in one or more implementations comprises application of heat and pressure to a sidewall comprising multiple layers and, in some cases, a plurality of fibers. To illustrate a means of sealing, a system forming the disclosed reinforced thermoplastic bag may perform metal-metal embossing or rubber-metal embossing in one unit or two units close-coupled. In one or both cases, the system may pre-heat one or more films and/or preheat an outside surface of drive rolls. As a noun, "laminate" means a product produced by the affixing or adhering via one or more implementations described above.

In one or more implementations, the lamination or bonding between bag layers and/or a plurality of fibers of the present disclosure may be non-continuous (i.e., discontinuous or partially discontinuous). As used herein the terms "discontinuous bonding" or "discontinuous lamination" refers to lamination of two or more layers where the lamination is not continuous in the machine direction and not continuous in the transverse direction. More particularly, discontinuous lamination refers to lamination of two or more layers with repeating bonded patterns broken up by repeating un-bonded areas in both the machine direction and the transverse direction of the film (or alternatively, random bonded areas broken up by random un-bonded areas).

As similarly used herein the terms "partially discontinuous bonding" or "partially discontinuous lamination" refers to lamination of two or more layers where the lamination is substantially continuous in the machine direction or in the transverse direction, but not continuous in the other of the machine direction or the transverse direction. Alternately, partially discontinuous lamination refers to lamination of two or more layers where the lamination is substantially continuous in the width of the article but not continuous in the height of the article. Alternatively, partially discontinuous lamination can include two or more layers substantially continuous in the height of the article but not continuous in the width of the article. More particularly, partially discontinuous lamination refers to lamination of two or more layers with repeating bonded patterns broken up by repeating unbounded areas in either the machine direction or the transverse direction.

As used herein, the term "machine direction" or "MD" refers to the direction along the length of the film, or in other words, the direction of the film as the film is formed during extrusion and/or coating. As used herein, the term "transverse direction" or "TD" refers to the direction across the film or perpendicular to the machine direction.

As also used herein, the term "flexible" refers to materials that are capable of being flexed or bent, especially repeatedly, such that they are pliant and yieldable in response to externally applied forces. Accordingly, "flexible" is substantially opposite in meaning to the terms inflexible, rigid, or unyielding. Materials and structures that are flexible, therefore, may be altered in shape and structure to accommodate external forces without integrity loss. Similarly, materials and structures that are flexible can conform to the shape of contacting objects without integrity loss. For example, a thermoplastic bag disclosed herein may include web materials which exhibit an "elastic-like" behavior in the direction of applied strain without the use of added traditional elastic. As used herein, the term "elastic-like" describes the behavior of web materials which when subjected to an applied strain, the web materials extend in the direction of the applied strain. When the applied strain is released, the web materials return, to a degree, to their pre-strained condition.

Film & Fiber Materials

In one or more implementations, the reinforced thermoplastic bag comprises thermoplastic films. As an initial matter, one or more layers of such films can comprise any flexible or pliable material comprising a thermoplastic material and that can be formed or drawn into a web or film. Each individual film layer may itself include a single layer or multiple layers. Adjuncts may also be included, as desired (e.g., pigments, slip agents, anti-block agents, tackifiers, or combinations thereof). The thermoplastic material of the films of one or more implementations can include, but are not limited to, thermoplastic polyolefins, including polyethylene, polypropylene, and copolymers thereof. Besides ethylene and propylene, exemplary copolymer olefins include, but are not limited to, ethylene vinylacetate (EVA), ethylene methyl acrylate (EMA) and ethylene acrylic acid (EAA), or blends of such olefins. Various other suitable olefins and polyolefins will be apparent to one of skill in the art.

Other examples of polymers suitable for use as films in accordance with the present invention include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), poly(ethylene butylacrylate), polyurethane, poly(ethylene-propylene-diene), ethylene-propylene rubber, and combinations thereof. Suitable biodegradable polymers include, for example, aliphatic polyesters, such as polycaprolactone, polyesteramides, polylactic acid (PLA) and its copolymers, polyglycolic acid, polyalkylene carbonates (e.g., polyethylene carbonate), poly-3-hydroxybutyrate (PHB), poly-3-hydroxyvalerate (PHV), poly-3-hydroxybutyrate-co-4-hydroxybutyrate, poly-3-hydroxybutyrate-co-3-hydroxyvalerate copolymers (PHBV), poly-3-hydroxybutyrate-co-3-hydroxyhexanoate, poly-3-hydroxybutyrate-co-3-hydroxyoctanoate, poly-3-hydroxybutyrate-co-3-hydroxydecanoate, poly-3-hydroxybutyrate-co-3-hydroxyoctadecanoate, and succinate-based aliphatic polymers (e.g., polybutylene succinate, polybutylene succinate adipate, polyethylene succinate, etc.); aliphatic-aromatic copolyesters (e.g., polybutylene adipate terephthalate, polyethylene adipate terephthalate, polyethylene adipate isophthalate, polybutylene adipate isophthalate, etc.); aromatic polyesters (e.g., polyethylene terephthalate, polybutylene terephthalate, etc.); and combinations thereof.

In at least one implementation of the present invention, a film can include linear low density polyethylene. The term "linear low density polyethylene" (LLDPE) as used herein is defined to mean a copolymer of ethylene and a minor amount of an alkene containing 4 to 10 carbon atoms. In addition, a LLDPE includes a density from about 0.910 to about 0.926 g/cm$^3$, and a melt index (MI) from about 0.5 to about 10. For example, one or more implementations of the present invention can use an octene co-monomer, solution phase LLDPE (MI=1.1; ρ=0.920). Additionally, other implementations of the present invention can use a gas phase LLDPE, which is a hexene gas phase LLDPE formulated with slip/AB (MI=1.0; ρ=0.920). One will appreciate that the present invention is not limited to LLDPE, and can include "high density polyethylene" (HDPE), "low density polyethylene" (LDPE), "ultra low density polyethylene" (ULDPE), and "very low density polyethylene" (VLDPE). Indeed, films made from any of the previously mentioned thermoplastic materials or combinations thereof can be suitable for use with the present invention.

In one or more embodiments, the plurality of fibers is selected from one or more of the following groups: polymers, hot melt adhesives, or pressure sensitive adhesives. For example, the plurality of fibers comprises a material from the polymer families comprising polyethylene (PE), polypropylene (PP), polyethylene terephthalate (PET), nylons, or polyurethanes. In certain embodiments with films comprising LLDPE, the plurality of fibers comprises LLDPE, VLDPE, ULDPE, or HDPE (e.g., to promote sustainability by ensuring the ability to directly feed process scrap back into product as reclaim).

Additionally or alternatively, the plurality of fibers comprises hot melt adhesives. Hot melt adhesives can include one or more base materials with various additives. For instance, in one or more embodiments, EVA (ethylene vinyl acetate) is used as the main polymer, with terpene-phenol resin (TPR) as the tackifier. In certain cases, ethylene-vinylacetate-maleic anhydride and ethylene-acrylate-maleic anhydride terpolymers offer increased performance. Additional examples include ethylene n-butyl acrylate (EnBA), ethylene-acrylic acid (EAA) and ethylene-ethyl acetate (EEA). In some embodiments, polyolefins (PO), atactic polypropylene (PP or APP), polybutene-1, oxidized polyethylene, etc.) are preferred due to compatibility as reclaim. Amorphous polyolefin (APO/APAO) polymers are compatible with many solvents, tackifiers, waxes, and polymers; they find wide use in many adhesive applications. APO hot melts are tacky, soft and flexible, and have good adhesion and longer open times than crystalline polyolefins. Thus, certain embodiments of the plurality of fibers include APO hot melts. Examples of APOs include amorphous (atactic) propylene (APP), amorphous propylene/ethylene (APE), amorphous propylene/butene (APB), amorphous propylene/hexene (APH), amorphous propylene/ethylene/butene.

In one or more embodiments, the plurality of fibers comprises pressure sensitive adhesives. Pressure sensitive adhesives (PSAs) can include an elastomer compounded with a suitable tackifier (e.g., a rosin ester). As an example, a PSA includes ethylene-vinyl acetate (EVA) with high vinyl acetate content. These or other PSAs can be formulated as hot-melts.

Further, in certain embodiments, the plurality of fibers is chemically incompatible with the substrate film (e.g., to prevent between the plurality of fibers and film layers). As an example, the plurality of fibers comprise PP or PET applied to a LLDPE film. PP and PET fibers are chemically incompatible with LLDPE. However, PP and PET fibers offer a superior strength benefit versus LLDPE owing to a comparatively higher tensile modulus. Furthermore, in one or more embodiments, the fibers are natural (e.g., naturally produced by plants and animals and are or derived from minerals). Example natural fibers include plant fibers, vegetable fibers, lignocellulosic fibers, or cellulosic fibers. In one or more implementations, the fibers are renewable. For instance, in one or more implementations, the fibers comprise renewable fibers from cellulose. Additionally, in one or more embodiments, the fibers are enhanced through treatments such as enzyme-based pretreatments, lignin treatment, coatings, carboxymethylation, etc.

One will appreciate in light of the disclosure herein that manufacturers may form the individual films or webs to be non-continuously bonded together so as to provide improved strength characteristics using a wide variety of techniques. For example, a manufacturer can form a precursor mix of the thermoplastic material including any optional additives. The manufacturer can then form the film(s) from the precursor mix using conventional flat extrusion, cast extrusion, or coextrusion to produce monolayer, bilayer, or multilayered films. In any case, the resulting film can be discontinuously bonded to another film at a later stage to provide the benefits associated with the present invention.

Alternative to conventional flat extrusion or cast extrusion processes, a manufacturer can form the films using other suitable processes, such as, a blown film process to produce monolayer, bilayer, or multilayered films. Such layers are subsequently discontinuously bonded with another film layer at a later stage. If desired for a given end use, the manufacturer can orient the films by trapped bubble, tenterframe, or other suitable processes. Additionally, the manufacturer can optionally anneal the films.

The extruder used in one or more implementations includes a conventional design using a die to provide the desired gauge. Some useful extruders are described in U.S. Pat. Nos. 4,814,135; 4,857,600; 5,076,988; 5,153,382; each of which are incorporated herein by reference in their entirety. Examples of various extruders that may be used in producing the films of the present invention include a single screw type modified with a blown film die, an air ring, and continuous take off equipment.

In one or more implementations, a manufacturer can use multiple extruders to supply different melt streams, which a feed block can order into different channels of a multichannel die. The multiple extruders can allow a manufacturer to form a multi-layered film with layers having different compositions. Such multi-layer film may later be non-continuously laminated with another layer of film to provide the benefits of the present invention.

In a blown film process, the die can be an upright cylinder with a circular opening. Rollers can pull molten plastic upward away from the die. An air-ring can cool the film as the film travels upwards. An air outlet can force compressed air into the center of the extruded circular profile, creating a bubble. The air can expand the extruded circular cross section by a multiple of the die diameter. This ratio is called the "blow-up ratio." When using a blown film process, the manufacturer can collapse the film to double the plies of the film. Alternatively, the manufacturer can cut and fold the film, or cut and leave the film unfolded.

Further, it will be appreciated that the plurality of fibers may be formed or applied via one or more manufacturing processes described below in relation to FIGS. 15A-15D. For example, the plurality of fibers may be melt blown extruded on or between plies, spun bond on or between plies, or hot melt sprayed on or between plies.

Figure 1B:
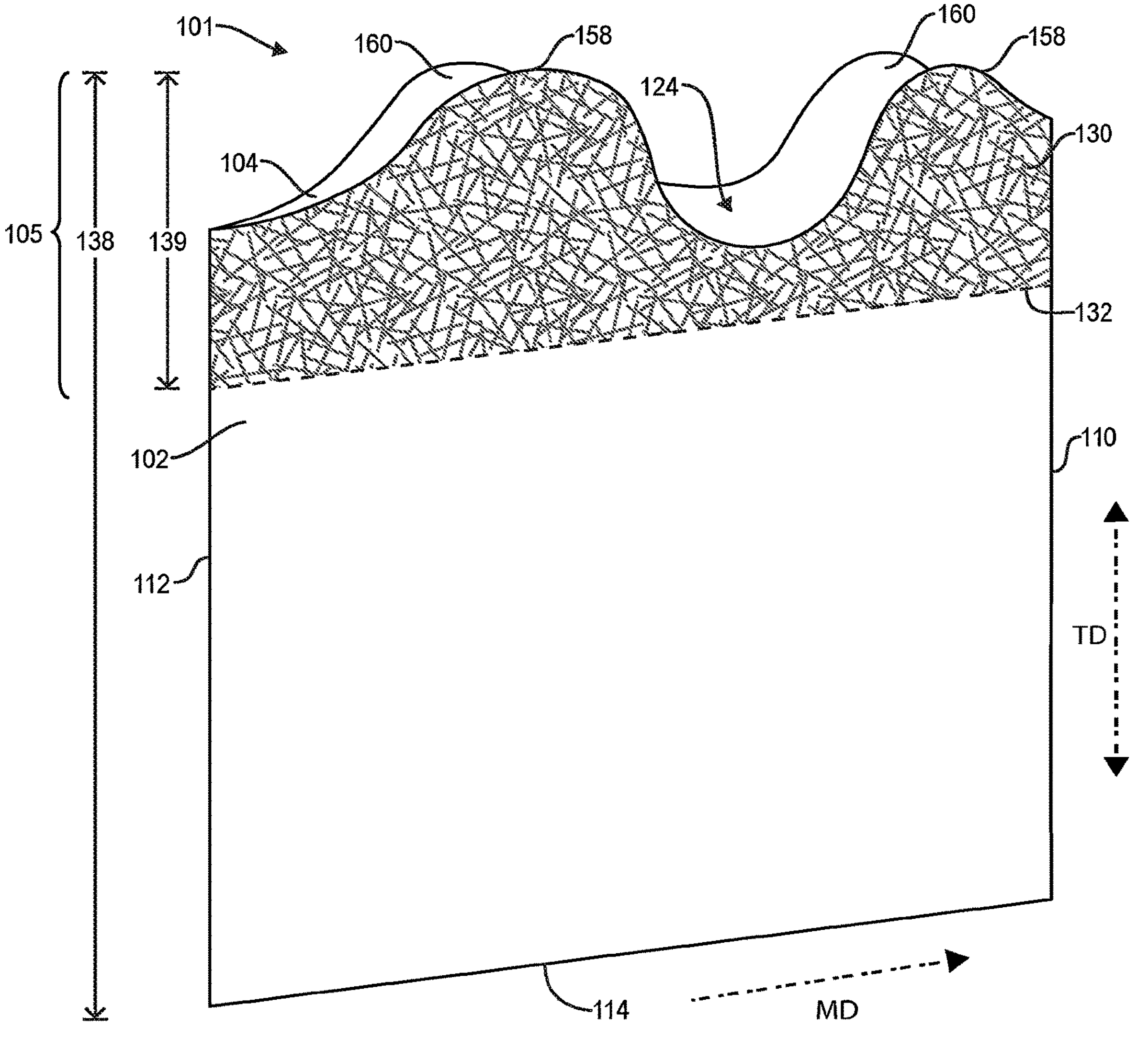

Additional detail will now be provided regarding a reinforced thermoplastic bag in relation to illustrative figures portraying example embodiments and implementations of the reinforced thermoplastic bag. For example, FIGS. 1A-1B illustrate respective reinforced thermoplastic bags 100, 101 in accordance with one or more embodiments. With respect to FIG. 1A, the reinforced thermoplastic bag 100 may be used as a liner for a garbage can or similar refuse container. The reinforced thermoplastic bag 100 can include a first thermoplastic sidewall 102 and an opposing second thermoplastic sidewall 104 opposite the first thermoplastic sidewall 102 to provide an interior volume 106. The first and second thermoplastic sidewalls 102, 104 may be joined along a first side edge 110, an opposing second side edge 112, and a closed bottom edge 114. The closed bottom edge 114 may extend between the first and second side edges 110, 112. In one or more implementations the first and second thermoplastic sidewalls 102, 104 are joined along the first and second side edges 110, 112 and along the closed bottom edge 114 by any suitable process, such as heat sealing. In alternative implementations, the closed bottom edge 114, or one or more of the first and second side edges 110, 112 can comprise a fold.

At least a portion of the respective first and second thermoplastic sidewalls 102, 104 may remain un-joined to define an opening 124 located opposite the closed bottom edge 114. The opening 124 may be used to deposit items into the interior volume 106. Furthermore, the reinforced thermoplastic bag 100 may be placed into a trash receptacle. When placed in a trash receptacle, a top portion of the first and second thermoplastic sidewalls 102, 104 may be folded over the rim of the receptacle.

First and second top edges 120, 122 of the first and second thermoplastic sidewalls 102, 104 may be un-joined or unattached to each other. In particular, the first and second top edges 120, 122 can be folded back into the interior volume 106 and may be attached to the reinforced thermoplastic bag 100 via respective hem seals 145*a*, 145*b* and/or side seals 154, 156 (e.g., at the first and second side edges 110, 112). For example, one or more implementations can include a draw tape 140 to close or reduce the opening 124. To accommodate the draw tape 140 the first top edge 120 of the first thermoplastic sidewall 102 may be folded back onto the interior surface of the first thermoplastic sidewall 102, thereby forming a first hem channel disposed within a first hem 142. Similarly, the second top edge 122 of the second thermoplastic sidewall 104 may be folded back onto the interior surface of the second thermoplastic sidewall 104, thereby forming a second hem channel disposed within a second hem 144.

As shown by FIG. 1A, in one or more implementations, the draw tape 140 extends loosely through the first and second hem channels of the first and second hems 142, 144. To access the draw tape 140, first and second hem holes 146, 148 may be disposed through the respective first and second hems 142, 144. Pulling the draw tape 140 through the first and second hem holes 146, 148 will constrict the first and second hems 142, 144 thereby closing or reducing the opening 124. The draw tape closure may be used with any of the implementations of a reinforced thermoplastic bag described herein.

To strengthen the reinforced thermoplastic bag 100 (e.g., to reduce ruptures or punctures), the reinforced thermoplastic bag 100 includes a plurality of fibers 130. In particular, FIG. 1A shows that the reinforced thermoplastic bag 100 includes the plurality of fibers 130 applied to at least a portion of the grab-zone 105. In other embodiments, however, the plurality of fibers 130 is applied to other top-of-bag areas and/or in other configurations. Indeed, as will be described below, FIGS. 2A-2B, 3A-3C, and 4A-4B illustrate various embodiments of the plurality of fibers 130 reinforcing certain areas of a thermoplastic bag according to various fiber application placement and fiber patterns.

With respect to FIG. 1A, the plurality of fibers 130 is bonded to at least one layer of the first thermoplastic sidewall 102. In certain implementations, the plurality of fibers 130 is bonded exclusively to a single film layer of the first thermoplastic sidewall 102. In other implementations, the plurality of fibers 130 bonds together two film layers of the first thermoplastic sidewall 102. Regardless of implementation, the plurality of fibers 130 can be bonded in varying degrees to a film layer. For example, in certain embodiments, the bonds between the plurality of fibers 130 and a film layer are peelable bonds such that the plurality of fibers 130 is removably tacked onto the film layer. As another example, the bonds between the plurality of fibers 130 and a film layer are fused bonds such that the plurality of fibers 130 is melt-extruded and thermally welded onto the film layer.

In certain embodiments, the plurality of fibers 130 is non-continuously bonded to the first thermoplastic sidewall 102. For instance, in certain implementations, Additionally or alternatively, at least a portion of the plurality of fibers 130 is attached to the first thermoplastic sidewall 102 via the side seals 154, 156 that join the first and second thermoplastic sidewalls 102, 104 along the first and second side edges 110, 112. Similarly, at least a portion of the plurality of fibers 130 is attached to the first thermoplastic sidewall 102 via the hem seal 145*a*. Although not illustrated in FIG. 1A, another plurality of fibers 130 may likewise be attached to the second thermoplastic sidewall 104.

In one or more implementations, the grab-zone 105 for each of the first and second thermoplastic sidewalls span between an adjustable grab-zone boundary 132 and the hem seal 145*a*. In addition, the grab-zone 105 can span between the first and second side edges 110, 112. Accordingly, in one or more implementations the plurality of fibers 130 extends between the side seals 154, 156 and coextensive with the grab-zone 105. In alternative implementations, the plurality of fibers 130 does not extend a full distance between the side seals 154, 156 and/or does not span an entirety of the grab-zone 105. Regardless of the implementation, the plurality of fibers 130 can provide extra material in the grab-zone 105 of the reinforced thermoplastic bag 100 that may be more prone to failure.

To illustrate, the plurality of fibers 130 can extend across one or more of the first or second thermoplastic sidewalls 102, 104 a distance 139. As shown in FIG. 1A, the distance 139 for the plurality of fibers 130 of the first thermoplastic sidewall 102 spans from the adjustable grab-zone boundary 132 to a position proximate to (or within a threshold distance below) the hem seal 145*a*. In such embodiments, the plurality of fibers 130 for the first thermoplastic sidewall 102 is secured to one or more layers of the first thermoplastic sidewall 102, but not via the hem seal 145*a*.

Figure 2A:
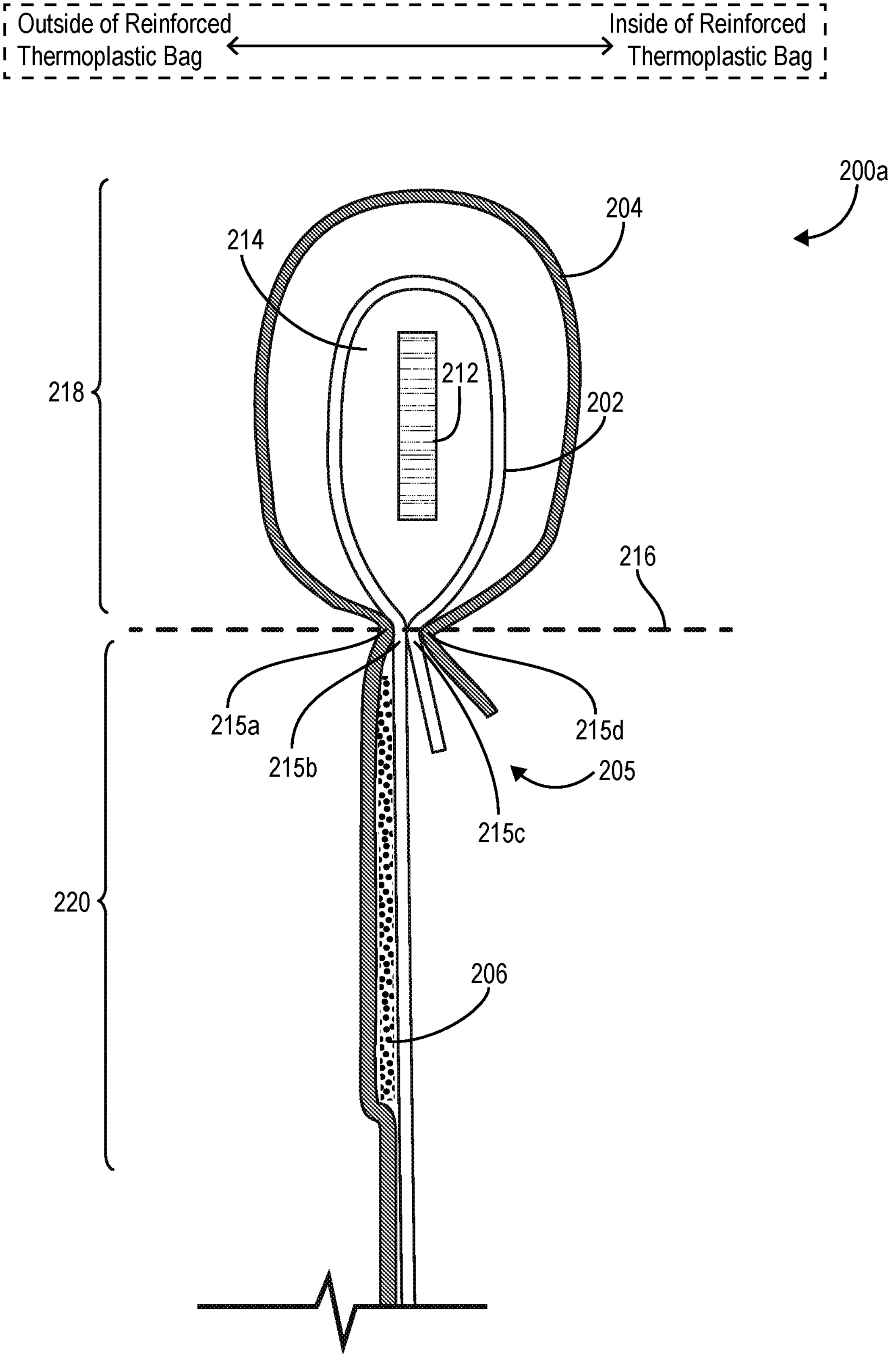
FIGS. 2A-2B illustrate respective upper cross-sectional views of sidewalls of reinforced thermoplastic bags including a plurality of fibers in accordance with one or more embodiments.
Figure 2B:
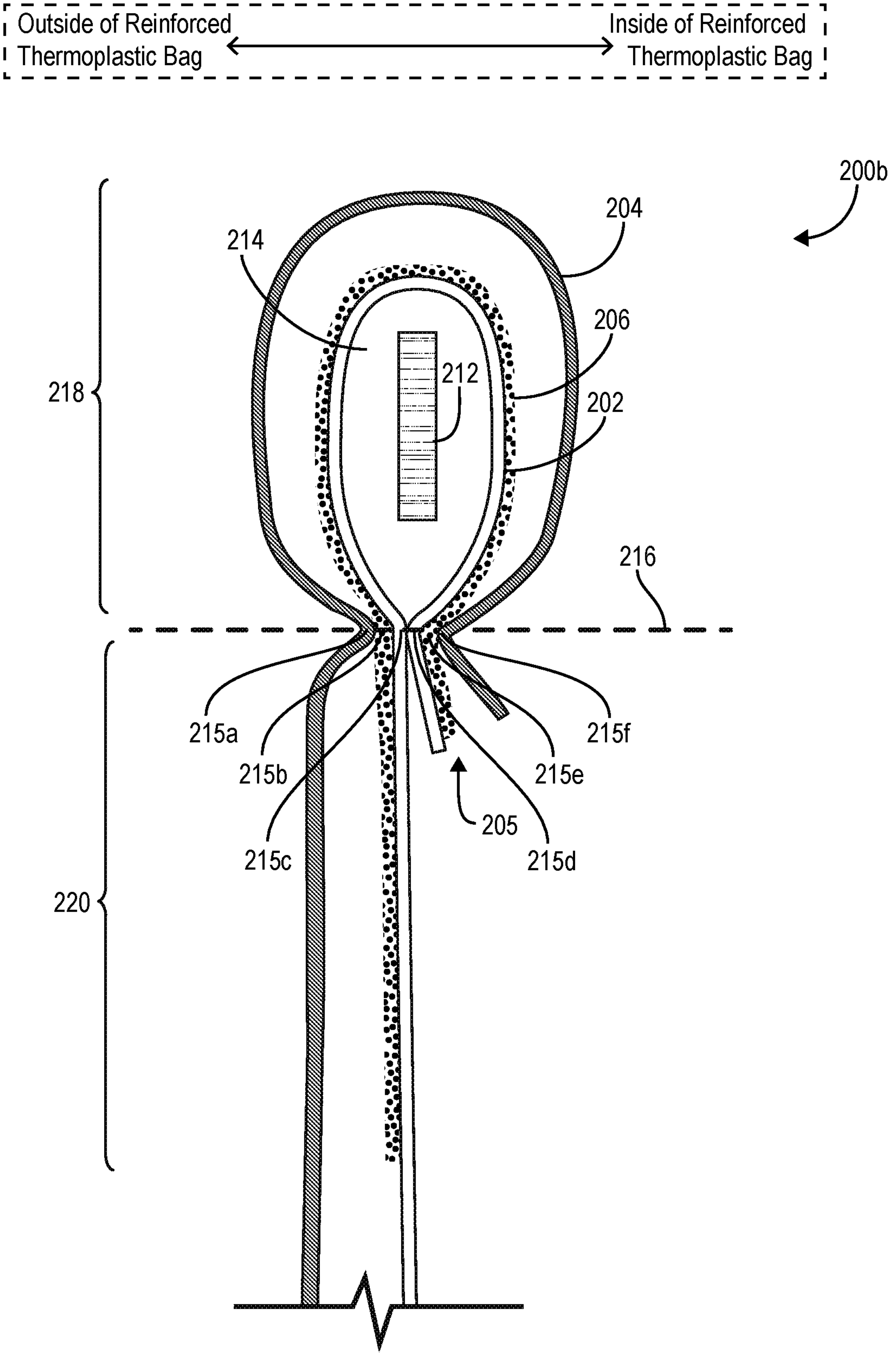
Figure 4A:
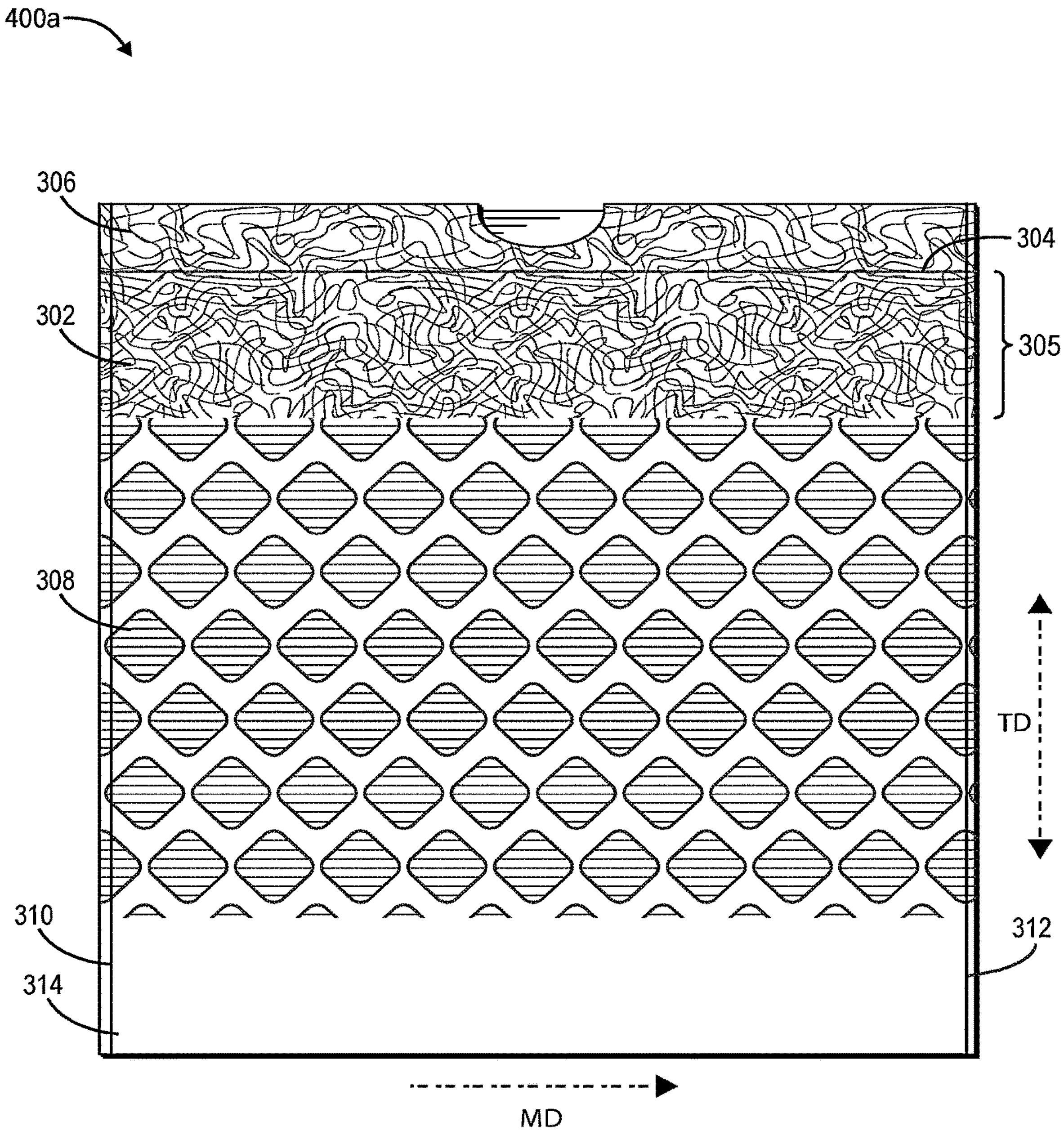
FIGS. 4A-4B illustrate example embodiments of reinforced thermoplastic bags implementing a plurality of fibers in accordance with one or more embodiments.

In other embodiments, however, the distance 139 for plurality of fibers 130 (e.g., of the first thermoplastic sidewall 102) extends from the adjustable grab-zone boundary 132 to the top of the first hem 142 proximate the opening 124. In this embodiment, the plurality of fibers 130 comprises a hem-channel reinforcement portion that extends from the hem seal 145*a*, folds proximate the opening 124, and extends back to the hem seal 145*a* (e.g., as shown in FIGS. 2B and 4A). In addition, the plurality of fibers 130 in this embodiment is included in the hem skirt (e.g., as described below in relation to FIG. 2B).

Figure 4B:
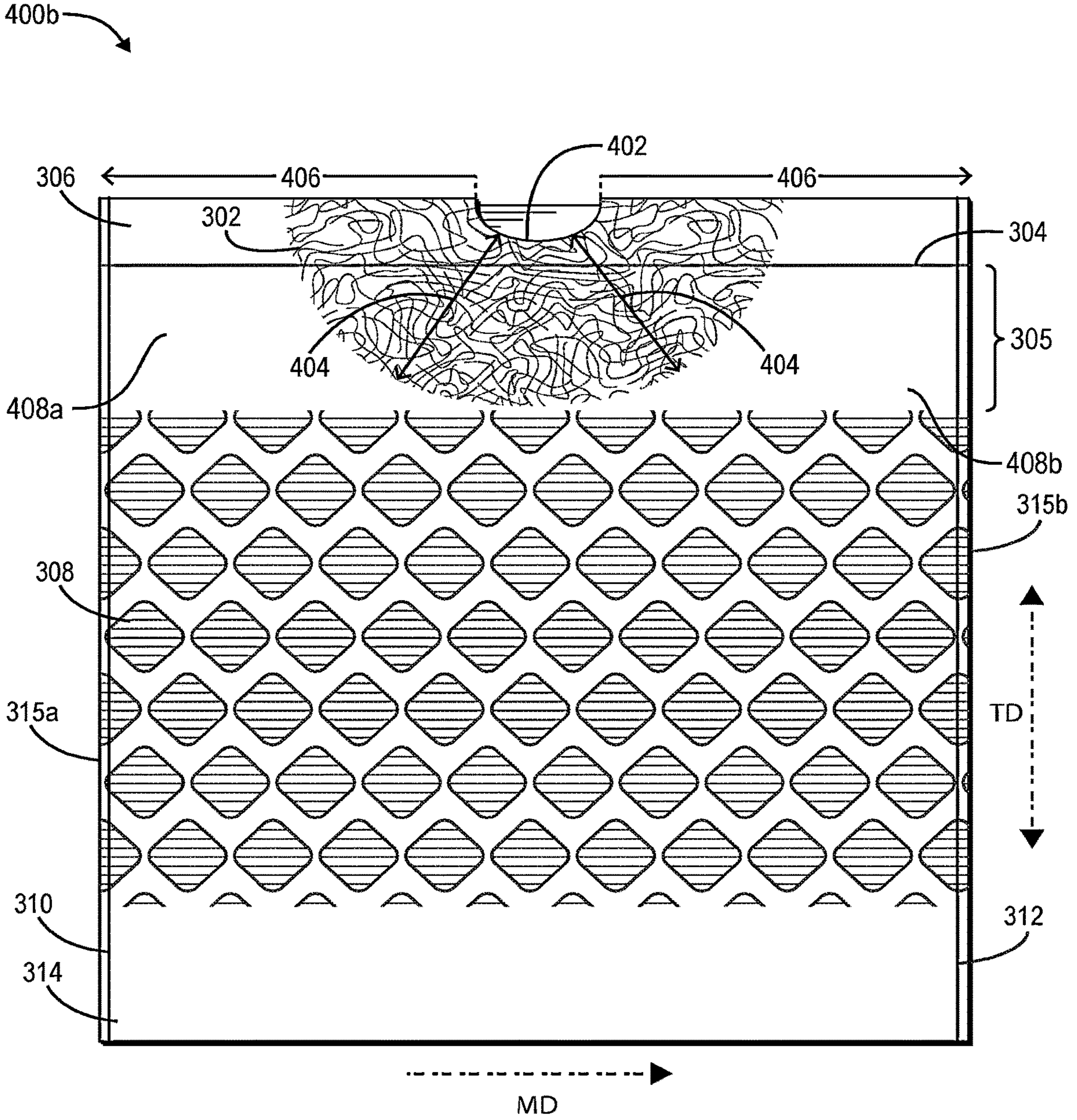

Still, in other embodiments, the distance 139 for the plurality of fibers 130 (e.g., of the first thermoplastic sidewall 102) extends from the adjustable grab-zone boundary 132 to a position in the first hem 142 above the hem seal 145*a* (but not proximate the opening 124 as suggested above. Similarly, in one or more embodiments, the plurality of fibers 130 does not reinforce an entirety of the hem channel. Rather, the plurality of fibers 130 may reinforce a particular area, such as around the first hem hole 146 (e.g., as shown in FIG. 4B).

In these or other embodiments, the plurality of fibers 130 can extend the same distance 139 in a same or similar pattern of reinforcement along the second thermoplastic sidewall 104 as along the first thermoplastic sidewall 102. In alternative implementations, the plurality of fibers 130 can extend different distances and/or in differing patterns along the first and second thermoplastic sidewalls 102, 104. Regardless of implementation, the distance 139 in some cases is between approximately 5% and 50% of a height 138 of the reinforced thermoplastic bag 100, where the height 138 is measured from the closed bottom edge 114 to the opening 124. Additionally or alternatively, in one or more implementations the plurality of fibers 130 can extend approximately 20% of the height 138 of the reinforced thermoplastic bag 100.

In more detail, the distance 139 in one or more implementations, may have a first range of about 1 inch (2.54 cm) to about 10 inches (25.4 cm), a second range of about 3 inches (7.6 cm) to about 8 inches (20.3 cm), a third range of about 4 inches (10.2 cm) to about 6 inches (15.2 cm), a fourth range of about 10 inches (25.4 cm) to about 30 inches (76.2 cm), a fifth range of about 20 inches (50.8 cm) to about 48 inches (121.9 cm), a sixth range of about 23 inches (58.4 cm) to about 33 inches (83.8 cm), and a seventh range of about 26 inches (66 cm) to about 28 inches (71.1 cm). In one implementation, the distance 139 may be 5 inches (12.7 cm). In alternative implementations, the distance 139 may be shorter or longer than the examples listed above. In any event, the distance 139 for the plurality of fibers is less than the height 138 of the reinforced thermoplastic bag 100 in one or more implementations. In still further implementations, the distance 139 for the plurality of fibers is equal to the height 138.

By comparison, the height 138 of the reinforced thermoplastic bag 100 may have a first range of about 20 inches (50.8 cm) to about 48 inches (121.9 cm), a second range of about 23 inches (58.4 cm) to about 33 inches (83.8 cm), and a third range of about 26 inches (66 cm) to about 28 inches (71.1 cm). In one implementation, the height 138 may be 25.375 inches (64.45 cm). In alternative implementations, the height 138 may be shorter or longer than the examples listed above.

In one or more embodiments, each of the first and second thermoplastic sidewalls 102, 104 and the plurality of fibers 130 can have a combined gauge or thickness (e.g., average distance between the major surfaces) between about 0.1 mils to about 10 mils, suitably from about 0.1 mils to about 4 mils, suitably in the range of about 0.1 mils to about 2 mils, suitably from about 0.1 mils to about 1.25 mils, suitably from about 0.9 mils to about 1.1 mils, suitably between about 0.2 mils to about 0.9 mils, and suitably between about 0.3 mils to about 0.7 mils. In these or other embodiments, the first and second thermoplastic sidewalls 102, 104 can have a greater thickness than a diameter of the plurality of fibers 130. In alternative implementations, the first and second thermoplastic sidewalls 102, 104 have a thickness that is approximately equivalent to a diameter of the plurality of fibers 130. In yet further implementations, the plurality of fibers 130 can have a diameter that is greater than a thickness of the first and second thermoplastic sidewalls 102, 104. It will be appreciated that the diameter of the plurality of fibers 130 can be optimized for various purposes, including basis weight, visual distinction, mechanical performance, and/or tactile feel.

Additionally or alternatively, in one or more embodiments, one or more of the first and second thermoplastic sidewalls 102, 104 or the plurality of fibers 130 can have a uniform or consistent gauge. In alternative implementations, one or more of the first thermoplastic sidewall 102, the second thermoplastic sidewall 104, or the plurality of fibers 130 need not be consistent or uniform. Thus, the gauge of one or more of the first thermoplastic sidewall 102, the second thermoplastic sidewall 104, and/or the plurality of fibers 130 can vary due to product design, manufacturing defects, tolerances, or other processing issues. For example, the combination of the plurality of fibers 130 and a thermoplastic sidewall can purposefully provide a non-uniform composition (e.g., a rough or uneven tactile feel) to validate or increase consumer perception of bag strength.

Additionally, in certain implementations, one or more of the first thermoplastic sidewall 102, the second thermoplastic sidewall 104, and/or the plurality of fibers 130 is incrementally stretched. For example, in one or more implementations, one or more of the first thermoplastic sidewall 102, the second thermoplastic sidewall 104, and/or the plurality of fibers 130 is incrementally stretched by one or more of MD ring rolling, TD ring rolling, SELFing, or other methods described in NON-CONTINUOUSLY LAMINATED MULTI-LAYERED BAGS of U.S. patent application Ser. No. 13/273,384, filed on Oct. 14, 2011 (hereafter "Fraser"), the contents of which are expressly incorporated herein by reference. Incrementally stretching one or more of the first thermoplastic sidewall 102, the second thermoplastic sidewall 104, and/or the plurality of fibers 130 can increase or otherwise modify one or more of the tensile strength, tear resistance, impact resistance, or elasticity of the films (while also reducing the basis weight of the film).

The first thermoplastic sidewall 102, the second thermoplastic sidewall 104, and the plurality of fibers 130 can each comprise thermoplastic material. In one or more implementations, the first and second thermoplastic sidewalls 102, 104 can comprise the same thermoplastic material as the plurality of fibers 130. In alternative implementations, the plurality of fibers 130 can comprise a different material than the first and second thermoplastic sidewalls 102, 104. For example, the material of the plurality of fibers 130 may have a lower melting point than the material of the first and second thermoplastic sidewalls 102, 104 (e.g., for bonding purposes). As another example, the material of the plurality of fibers 130 may lack a chemical affinity to the material of the first and second thermoplastic sidewalls 102, 104 (e.g., to prevent bonding). In a further example, the plurality of fibers 130 may comprise a post-use reclaim material. In yet another example, the material of the plurality of fibers 130 may have a higher tensile strength, tear resistance, puncture resistance, elasticity, and/or abrasion resistance than the material of the first and second thermoplastic sidewalls 102, 104. A plurality of fibers 130 made of stronger and/or tougher material may help further protect thermoplastic bag 100 against rupture and/or puncture.

In addition to the forgoing, in one or more implementations the plurality of fibers 130 and the first and second thermoplastic sidewalls 102, 104 can comprise visual features, such as color. In some cases, the visual features the of plurality of fibers 130 and the first and second thermoplastic sidewalls 102, 104 comprise a same color. In alternative implementations, the visual features (e.g., colors) of the plurality of fibers 130 and the first and second thermoplastic sidewalls 102, 104 can differ for improved visual distinction. For example, in one or more implementations, the first and second thermoplastic sidewalls 102, 104 can comprise a lightly pigmented thermoplastic material or a white, translucent thermoplastic material. The plurality of fibers 130 can comprise a pigmented (e.g., non-white or colored) material. For example, in one or more implementations, the plurality of fibers 130 can comprise a dark (e.g., black) material. In such implementations, the areas of the reinforced thermoplastic bag 100 including the plurality of fibers 130 can (if positioned between sidewall layers or on an inner surface of the first and second thermoplastic sidewalls 102, 104) appear gray or otherwise visually distinct from the films when viewed from at least one of an outside surface or an inside surface of the reinforced thermoplastic bag 100.

For instance, when the reinforced thermoplastic bag 100 is placed inside a receptacle, an inside surface of the reinforced thermoplastic bag 100 is visible within the receptacle and/or as flipped over a top rim of the receptacle. In this configuration, the respective visual features (e.g., differing colors) of the plurality of fibers 130 and the first and second thermoplastic sidewalls 102, 104 may provide a visual signal of increased strength/durability through an inside surface of the reinforced thermoplastic bag 100. Similarly, when the reinforced thermoplastic bag 100 is held or viewed outside of a receptacle, an outside surface of the reinforced thermoplastic bag 100 is visible. In certain embodiments, the respective visual features (e.g., differing colors) of the plurality of fibers 130 and the first and second thermoplastic sidewalls 102, 104 may provide a visual signal of increased strength/durability through an outside surface of the reinforced thermoplastic bag 100. Thus, the differing color of the plurality of fibers 130 can serve to visually indicate to a consumer that such areas of the reinforced thermoplastic bag 100 are provided additional strength. By visibly including color in the plurality of fibers 130 to show through one or more sidewall layers from outside and/or inside viewing perspectives, the reinforced thermoplastic bag 100 specifically addresses a current consumer perception that conventional thermoplastic liners use less material and are therefore insufficiently strong.

The plurality of fibers 130, like the reinforced thermoplastic bag 100, can include numerous other material/visual properties. For example, in one or more implementations, the plurality of fibers 130 includes odor control additives, fragrance additives, etc. to improve and/or reduce an amount of foul odor, particularly in the grab-zone 105 near the opening 124 of the reinforced thermoplastic bag 100. These control additives, perfume additives, etc. in the grab-zone 105 near the opening 124 of the reinforced thermoplastic bag 100 can activate in response to stretching or grabbing of the reinforced thermoplastic bag 100 in these areas. Additionally or alternatively, such control additives, perfume additives, etc. in the grab-zone 105 near the opening 124 of the reinforced thermoplastic bag 100 are positioned so as to exude (closest to a user's nose) a pleasant odor and/or quell (e.g., mask, render inert, etc.) unpleasant odors from garbage positioned below the grab-zone 105.

Additionally, or alternatively, in one or more embodiments, the reinforced thermoplastic bag 100 includes one or more patterned portions (e.g., a patterned hem seal, a patterned sidewall, a patterning of a plurality of non-continuous bonds, and/or a patterned plurality of fibers). These patterned portions can serve to notify a consumer that such areas of the reinforced thermoplastic bag 100 are provided with additional strength. For instance, like color, patterned portions of the plurality of fibers 130 selectively located at certain positions of the reinforced thermoplastic bag 100 (e.g., at the first hem hole 146) specifically addresses a current consumer perception that conventional thermoplastic liners using less material are insufficiently strong or durable. Of course, the patterned portions can be associated with a variety of material properties as described above. However, the pattern-enhancing visibility of these portions can be perceived as corresponding specifically to increased strength and durability.

In a similar fashion, the plurality of fibers 130 can be denser in certain areas. For instance, the plurality of fibers 130 can have a greater basis weight (e.g., measured in grams/square meter) at particular areas for additional desired reinforcement and/or visual perception of bag strength. To illustrate, the plurality of fibers 130 may be denser around the first hem hole 146 compared to areas adjacent to the first and second side edges 110, 112 where the fiber basis weight is comparatively lower or, in some cases, zero.

As described above, the plurality of fibers 130 can reinforce the reinforced thermoplastic bag 100 comprising a draw tape disposed within hem channels defined by respective first and second top edges 120, 122 folded onto corresponding interior surfaces of the first and second thermoplastic sidewalls 102, 104. In such embodiments, the plurality of fibers 130 can reinforce the first and second thermoplastic sidewalls 102, 104 comprising multiple layers and/or a bag-in-bag (e.g., a first thermoplastic bag and a second thermoplastic bag positioned within the first thermoplastic bag). However, in one or more embodiments, the plurality of fibers 130 reinforces other types of thermoplastic bags (e.g., thermoplastic bags that do not employ a draw tape, a hem seal, a bag-in-bag construction). For example, FIG. 1B illustrates a non-drawstring reinforced thermoplastic bag 101 with the plurality of fibers 130 in accordance with one or more embodiments.

As shown in FIG. 1B, the plurality of fibers 130 is secured to the first thermoplastic sidewall 102 (e.g., via thermal bonding and/or via a plurality of non-continuous bonds described below in relation to FIG. 11). In addition, the plurality of fibers 130, as similarly described above, extends toward the closed bottom edge 114 across the first thermoplastic sidewall 102 for the distance 139 from proximate the opening 124 to the adjustable grab-zone boundary 132. The plurality of fibers 130 also extends between the first and second side edges 110, 112 in the grab-zone 105.

As further shown, the reinforced thermoplastic bag 101 comprises alternative closure mechanisms other than a draw tape. In particular, FIG. 1B illustrates the reinforced thermoplastic bag 101 comprising flaps 158, 160 (e.g., for tying shut the opening 124). In alternative implementations, the closure mechanism can comprise adhesive tapes, a tuck and fold closure, an interlocking closure, a slider closure, a zipper closure, or other closure structures known to those skilled in the art for closing a bag.

As mentioned above, a plurality of fibers can reinforce one or more thermoplastic sidewalls, including one or more layers and/or distinct bags (e.g., for a bag-in-bag). For example, FIGS. 2A-2B illustrate respective upper cross-sectional views of sidewalls 200*a*-200*b* including a plurality of fibers 206 in accordance with one or more embodiments. Opposing sidewalls to the sidewalls 200*a*-200*b* are omitted for clarity of illustration (as are portions of a reinforced thermoplastic bag below a grab-zone 220, such as the closed bottom edge 114 shown in FIGS. 1A-1B). Additionally, as indicated at the top of each of FIGS. 2A-2B, the sidewalls 200*a*-200*b* illustrate the outside of a reinforced thermoplastic bag to the inside of a reinforced thermoplastic bag in a left-to-right direction.

In one or more embodiments, the hem channel region 218 comprises a portion of the sidewalls 200*a*-200*b* above a hem seal 216. In contrast, the grab-zone 220 comprises another portion of the sidewalls 200*a*-200*b* extending below the hem seal 216 a distance toward a closed bottom edge (not shown). In particular, the hem seal 216 secures the fold-over of the top edge 205 of the sidewalls 200*a*-200*b* to an inside surface of the reinforced thermoplastic bag, thereby forming a hem channel 214 and a corresponding hem skirt that terminates at the top edge 205 of the plies of thermoplastic film forming the sidewalls. Disposed within the hem channel 214 includes a draw tape 212 (e.g., as a same or similar closing mechanism described above in relation to the draw tape 140 of FIG. 1A).

In particular, FIGS. 2A-2B illustrate a positional relationship between the plurality of fibers 206 and one or both of a first layer 202 and a second layer 204 of the sidewalls 200*a*-200*b* proximate a hem channel region 218 and/or the grab-zone 220. For example, the plurality of fibers 206 can include a hem-channel reinforcement portion extending around the hem channel 214 from a first attachment point at the hem seal 216 to a second attachment point at the hem seal 216 (e.g., to reinforce the hem channel region 218 as shown in FIG. 2B).

Additionally, or alternatively, the plurality of fibers 206 reinforces at least a portion of the grab-zone 220. For example, in one or more embodiments described below, the plurality of fibers 206 comprises a random or patterned arrangement of fibers positioned across the grab-zone 220. Specifically, the plurality of fibers 206 advantageously provides extra material for increased strength and durability at a portion of the grab-zone 220 below (e.g., at least two to four inches) a hem skirt formed by a fold-over of the top edge 205 of the sidewalls 200*a*-200*b*. Thus, where the hem skirt formed by the fold-over of the top edge 205 is too short to provide adequate reinforcement to the grab-zone 220, the plurality of fibers 206 extends at least several inches below the hem skirt toward the bottom fold (not shown) for enhanced reinforcement coverage.

As shown for the sidewall 200*a* of FIG. 2A, the plurality of fibers 206 is positioned between the first layer 202 (e.g., an inner layer/bag) and the second layer 204 (e.g., an outer layer/bag) in the grab-zone 220. Specifically, the sidewall 200*a* comprises the plurality of fibers 206 sandwiched between the second layer 204 and the first layer 202 that are attached at the hem seal 216 at respective attachment points 215*a*, 215*b*. In this embodiment, the plurality of fibers 206 does not extend into the hem channel region 218. Additionally, the plurality of fibers 206 is not positionally anchored via the hem seal 216. Indeed, only the first layer 202 and the second layer 204 are attached at the hem seal 216 via attachment points 215*a*-215*d*.

Moreover, as depicted in FIG. 2A, the plurality of fibers 206 is bonded (e.g., thermally bonded or non-continuously bonded) to both the first layer 202 and the second layer 204. In other embodiments, however, the plurality of fibers 206 is bonded only to the first layer 202 or only to the second layer 204, but not both layers.

It will be appreciated that, in this configuration, the plurality of fibers 206 can be adapted to provide myriad basis weights, gauges, material formulations, color pigmentation, etc. to impart the desired degree of reinforcement and/or visual cues (as described above). Moreover, by entrapping the plurality of fibers 206 between the first layer 202 and the second layer 204, cross-contamination of fibers with other manufacturing processes can be reduced or prevented. Similarly, positionally excluding the plurality of fibers 206 from the hem seal 216 can help prevent sealing complications. For instance, the plurality of fibers 206 positioned exclusively in the grab-zone 220 can prevent complication of sealing through materials of irregular thickness—thereby avoiding points of stress concentration and/or discontinuity that may lead to reduced seal integrity.

Unlike FIG. 2A, the sidewall 200*b* of FIG. 2B comprises the plurality of fibers 206 positioned between the first layer 202 (e.g., an inner layer/bag) and the second layer 204 (e.g., an outer layer/bag) in both the hem channel region 218 and the grab-zone 220. In particular, FIG. 2B shows the plurality of fibers 206 reinforcing the hem channel region 218 in between the first layer 202 and the second layer 204 by extending around the hem channel 214 between attachment points 215*b*, 215*e* at the hem seal 216. In this case, the first layer 202 forms a first, innermost ply bounding the hem channel 214 such that the first layer 202 is positioned proximate to the draw tape 212 between attachment points 215*c*, 215*d* at the hem seal 216. The plurality of fibers 206 forms a second, reinforcing middle fiber layer bounding the hem channel 214 between attachment points 215*b*, 215*e* at the hem seal 216. In addition, the second layer 204 forms a third, outer ply bounding the hem channel 214 between attachment points 215*a*, 215*f* at the hem seal 216.

Moreover, as depicted in FIG. 2B, the plurality of fibers 206 is bonded (e.g., thermally bonded or non-continuously bonded) to only the first layer 202. In other embodiments, however, the plurality of fibers 206 is bonded solely to the second layer 204 or else both of the first layer 202 and the second layer 204 (as in FIG. 2A).

The portion of the plurality of fibers 206 bounding the hem channel 214 can reinforce the hem channel 214. In particular, when the draw tape 212 is pulled through draw tape notches (see first and second hem holes 146, 148 of FIG. 1A as an example) the plurality of fibers 206 bounding the hem channel 214 can help reduce tearing of the hem channel 214 near the draw tape notches. Similarly, the plurality of fibers 206 bounding the hem channel 214 can help prevent tearing or puncturing when a user grabs the hem channel 214 or lifts the draw tape 212 when removing the reinforced thermoplastic bag from a receptacle.

Further, FIG. 2B shows the sidewall 200*b* includes the plurality of fibers 206 extending across the grab-zone 220 for additional reinforcement. In particular, the plurality of fibers 206 extends away from attachment point 215*b* at the hem seal 216 towards a bottom fold (not shown). In this manner, the plurality of fibers 206 extending across the grab-zone 220 can strengthen the grab-zone 220 and help prevent tearing, puncturing, rips, or other undesired damage (as described above in relation to FIG. 2A). Furthermore, reinforcing the grab-zone 220 in this way does not require alteration to the other traditional components of the reinforced thermoplastic bag such as the hem skirt. Accordingly, such reinforcement does not require retrofitting of conventional components of a bag making machine.

Additionally or alternatively to a plurality of fibers positioned between layers of the sidewalls, it will be appreciated that one or more embodiments include the plurality of fibers 206 secured to the outside of the bag and/or the inside of the bag.

Figure 3A:
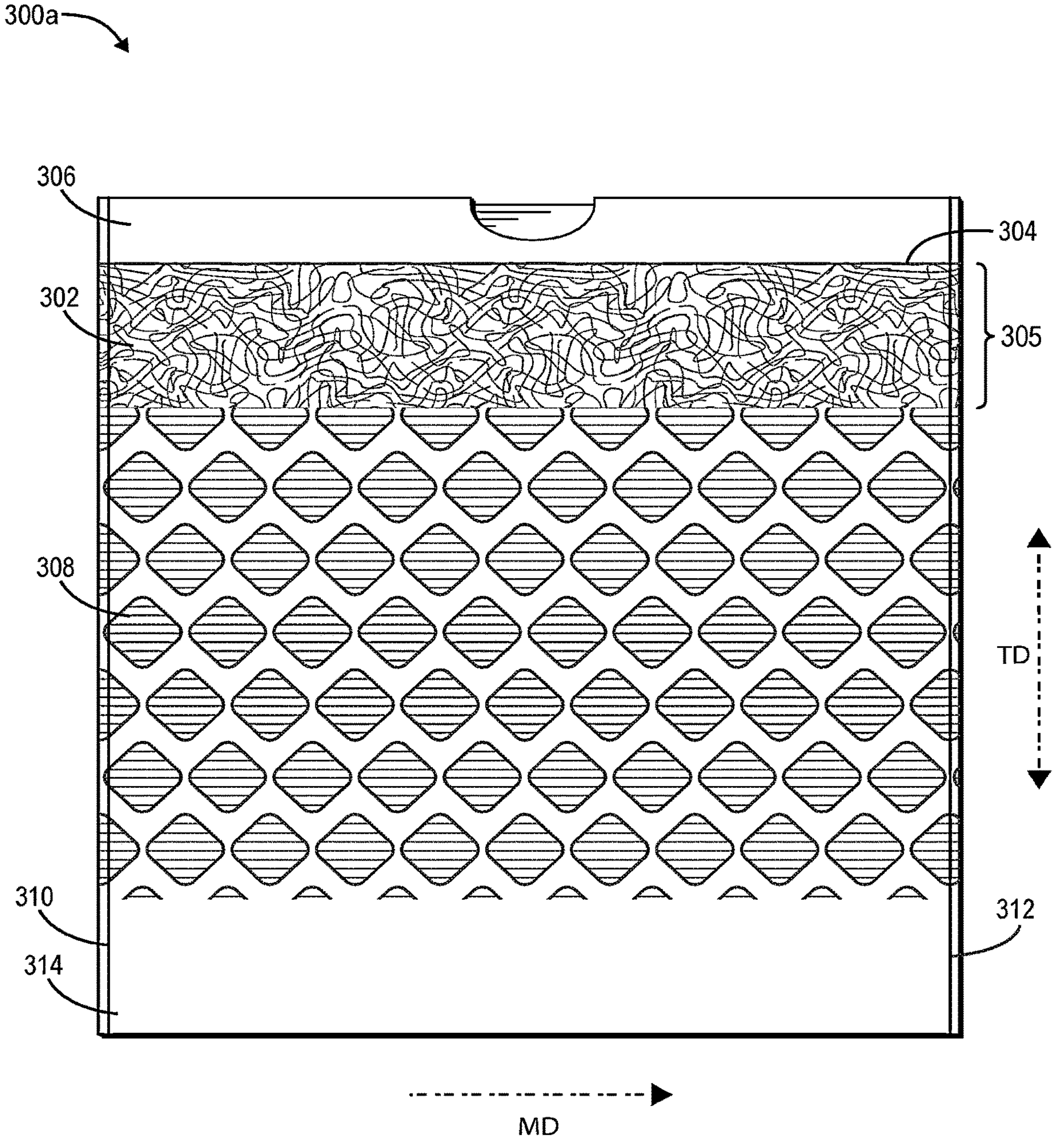
FIGS. 3A-3C illustrate example embodiments of reinforced thermoplastic bags implementing a plurality of fibers in accordance with one or more embodiments.
Figure 3B:
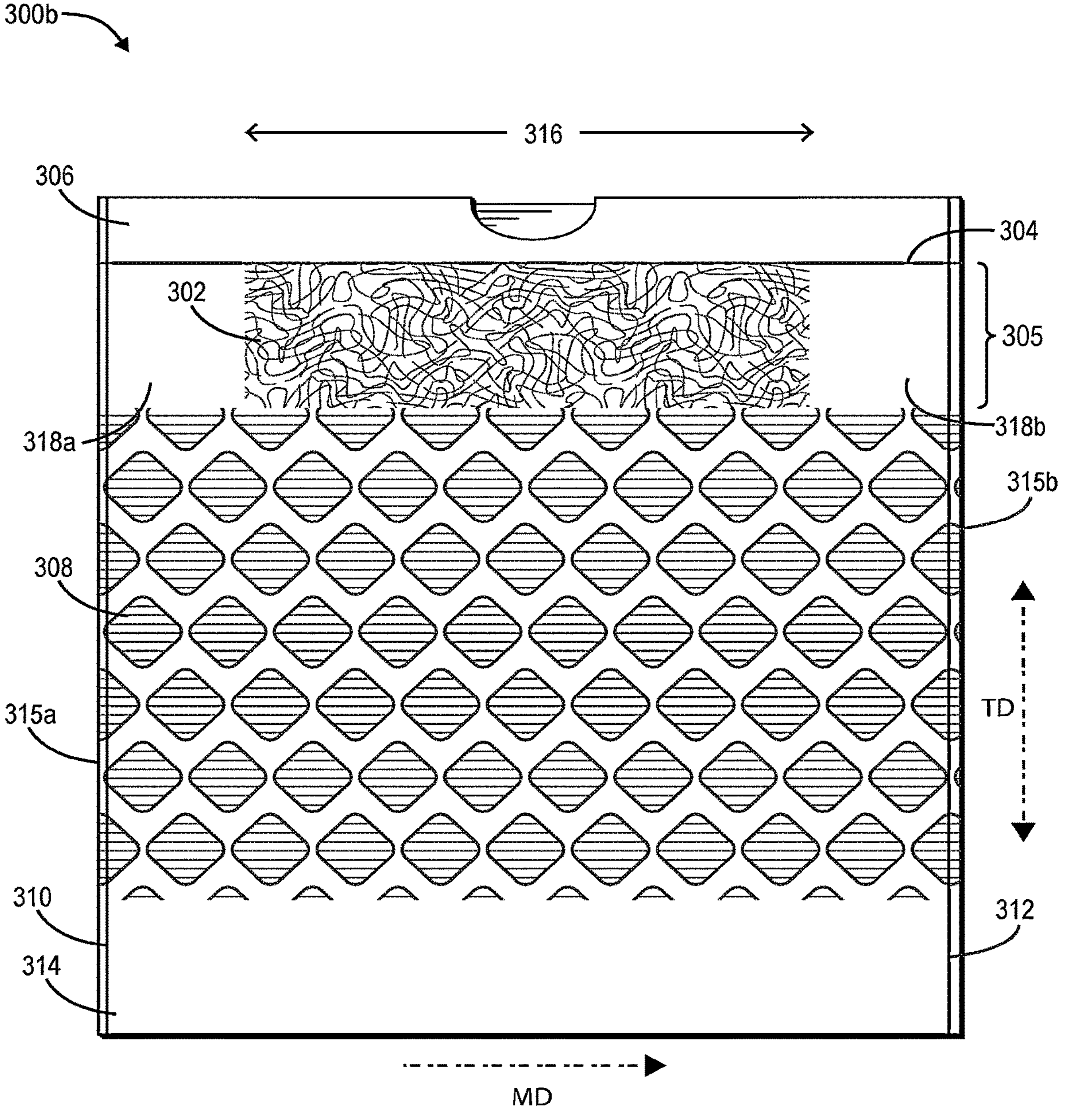
Figure 3C:
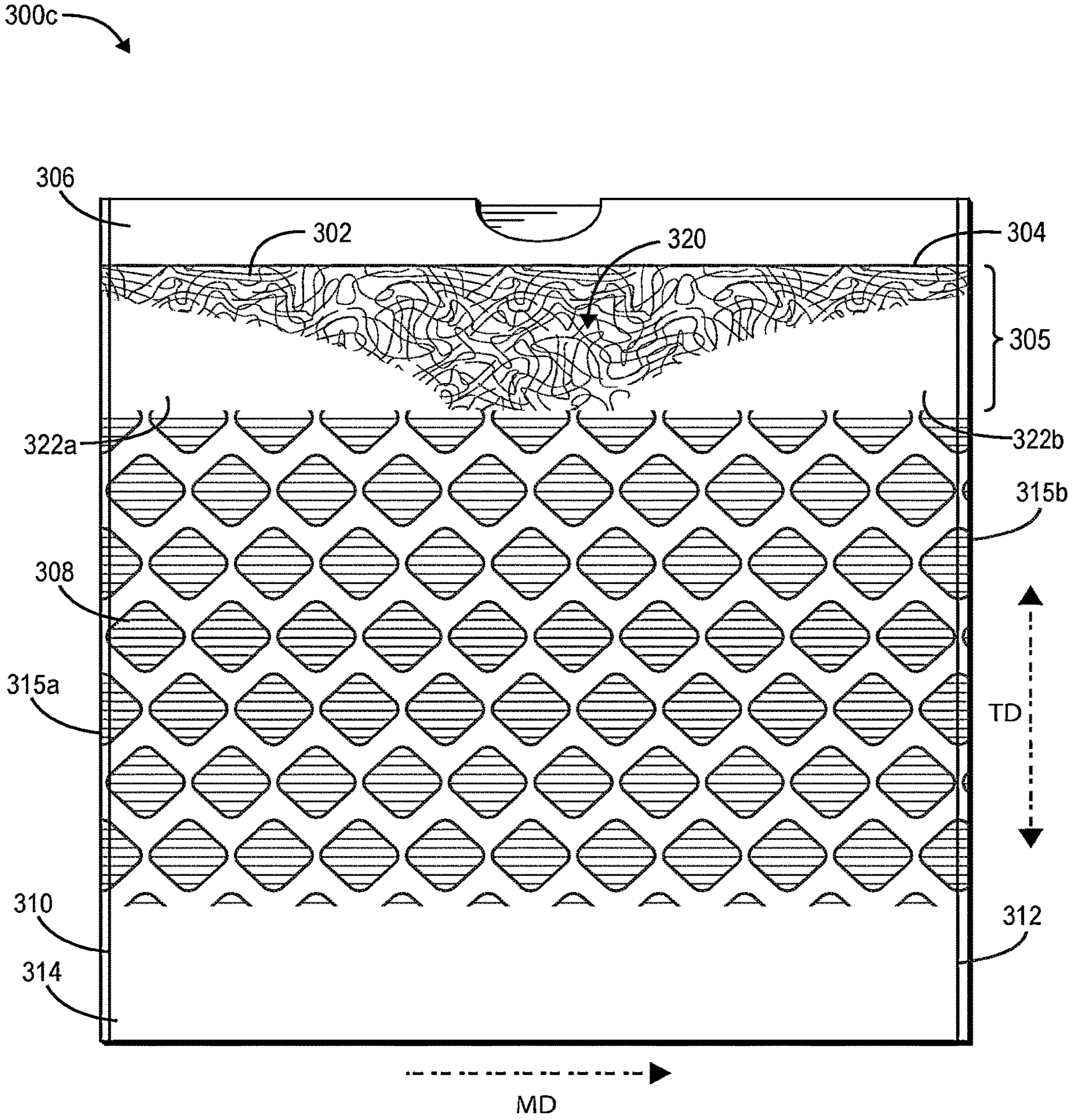

FIGS. 3A-3C illustrate example embodiments of reinforced thermoplastic bags 300*a*-300*c* implementing a plurality of fibers 302 in accordance with one or more embodiments. For example, the reinforced thermoplastic bags 300*a*-300*c* include drawstring bags similar to the reinforced thermoplastic bag 100 of FIG. 1A. Additionally, as shown in FIG. 3A, the reinforced thermoplastic bag 300*a* comprises the plurality of fibers 302 positioned between side seals 310 and 312 and coextensive with a grab-zone 305 below a hem 306. Specifically, the plurality of fibers 302 is sandwiched in between the hem seal 304 and an area 308.

In addition, the plurality of fibers 302 is applied randomly across the grab-zone 305. In other embodiments, however, the plurality of fibers 302 can be applied differently. For example, in certain embodiments, the plurality of fibers 302 is patternized in the aggregate (e.g., to form a shaped fiber region on the reinforced thermoplastic bag 300*a*). Similarly, in certain embodiments, the plurality of fibers 302 is patternized on a more granular level (e.g., such that individual fiber strands correspond to a particular structure). In this manner, the plurality of fibers 302 can efficiently provide extra material to strengthen the grab-zone 305 and provide corresponding visual/tactile cues to consumers.

As further shown in FIG. 3A, the area 308 comprises a portion of thermoplastic film arranged in a particular bonding pattern (e.g., a fenced diamond bonding pattern) for imparting additional or alternative material properties as described above in relation to SELFing methods. Inside each fenced diamond of the area 308, the reinforced thermoplastic bag 300*a* comprises horizontal lines or "fences" disposed between non-bonded portions. Additionally as shown, the area 308 comprises landing portions defining a spatial region between each of the fenced diamond patterns that are devoid of bonding. In general, the fenced diamonds of the area 308 are spatially configured relative to each other to allow about 1/16 of an inch, about 1/8 of an inch, or about 1/4 of an inch of a landing portion between discrete fenced diamonds.

Below the area 308, the reinforced thermoplastic bag 300*a* comprises a lower portion 314 that is devoid of bonding. In one or more embodiments, the lower portion 314 is between 1/16 of an inch and 8 inches in height and extends in length from the side seal 310 to the side seal 312. In other embodiments, the lower portion 314 is between 1 inch and 4 inches in height.

Similar to FIG. 3A, the reinforced thermoplastic bag 300*b* in FIG. 3B also comprises the plurality of fibers 302. Differently, however, the reinforced thermoplastic bag 300*b* comprises areas 318*a*, 318*b* within the grab-zone 305 that are devoid of fibers. The area 318*a* extends from a first side edge 315*a* towards a central region of the grab-zone 305. Likewise, the area 318*b* extends from a second side edge 315*b* towards the central region of the grab-zone 305. Accordingly, the plurality of fibers 302 in FIG. 3B spans a distance 316 between the side seals 310, 312 that is less than a full distance between the side seals 310, 312. In certain embodiments, the distance 316 is 25%, 50%, 75%, etc. of the full distance between the side seals 310, 312. In this manner, the plurality of fibers 302 can efficiently reinforce a central region of the reinforced thermoplastic bag 300*b* that typically experiences greater material stresses/strain. Moreover, by avoiding the side seals 310, 312, the plurality of fibers 302 in FIG. 3B can avoid associated complications with the sealing process that may lead to seal degradation and/or failure. Thus, as shown by FIG. 3B, in one or more implementations, the plurality of fibers is registered to a predetermined position/area on the reinforced thermoplastic bag 300*b* during the manufacturing process. In particular, the manufacturing process in such implementations can involve using sensors to apply the plurality of fibers to in the same position on each bag made sequentially during the manufacturing process.

In contrast to FIGS. 3A-3B, FIG. 3C shows the reinforced thermoplastic bag 300*c* comprising the plurality of fibers 302 arranged in a tapering pattern (e.g., a wavy pattern). Specifically, the plurality of fibers 302 tapers in height from a central region 320 within the grab-zone 305 towards the side edges 315*a*, 315*b*. That is, the plurality of fibers 302 is concentrated more at the central region 320 than at areas closer to the side edges 315*a*, 315*b*. As a result, areas 322*a*, 322*b* that are devoid of fibers inversely taper in height from proximate the side edges 315*a*, 315*b* towards to the central region 320. In this manner, the reinforced thermoplastic bag 300*c* can reinforce the central region 320 while also reducing overall fiber material consumption and/or fiber interaction with the side seals 310, 312. Indeed, similar to the implementation of FIG. 3B, the plurality of fibers 302 is registered to a predetermined position/area on the reinforced thermoplastic bag 300*c* during the manufacturing process.

As just discussed in relation to FIGS. 3A-3C, a plurality of fibers can be strategically positioned within a grab-zone for reinforcement. In certain embodiments, reinforced thermoplastic bags can also include hem channel reinforcement. FIGS. 4A-4B illustrate example embodiments of reinforced thermoplastic bags 400*a*-400*b* implementing the plurality of fibers 302 in accordance with one or more such embodiments. For example, the reinforced thermoplastic bags 400*a*-400*b* include drawstring bags similar to the reinforced thermoplastic bags 300*a*-300*c* discussed above in relation to FIGS. 3A-3C. Differently, however, the reinforced thermoplastic bags 400*a*-400*b* additionally include the plurality of fibers 302 at the hem 306 above the hem seal 304.

For instance, as shown by the reinforced thermoplastic bag 400*a* of FIG. 4A, the plurality of fibers 302 extends from the side seal 310 to the side seal 312 and coextensively with the grab-zone 305 and the hem 306. In this manner, the plurality of fibers 302 can provide greater strength to a larger portion of the top-of-bag. Similarly, the plurality of fibers 302 spanning both the grab-zone 305 and the hem 306 provides a more readily seen visual cue to signal strength to consumers.

In contrast, the reinforced thermoplastic bag 400*b* of FIG. 4B comprises a registered patch in which the plurality of fibers 302 is concentrated around a hem hole 402 for correspondingly strengthening the film portions adjacent to the hem hole 402. Indeed, as shown in FIG. 4B, the plurality of fibers 302 extends outwardly (e.g., away in a radial fashion) from the hem hole 402 a distance 404. The distance 404 is less than a distance 406 measured from the hem hole 402 to either of the side edges 315*a*, 315*b*. In certain embodiments, the distance 404 is 25%, 50%, 75% etc. of the distance 406. In particular embodiments, the distance 404 is dependent on the desired amount of reinforcement to the hem hole 402. In other embodiments, the distance 404 corresponds to a distance between the hem hole 402 and the area 308. Correspondingly, areas 408*a*, 408*b* devoid of fibers can be sized and shaped depending on the spatial arrangement or the distance 404 for the plurality of fibers 302.

Figure 5:
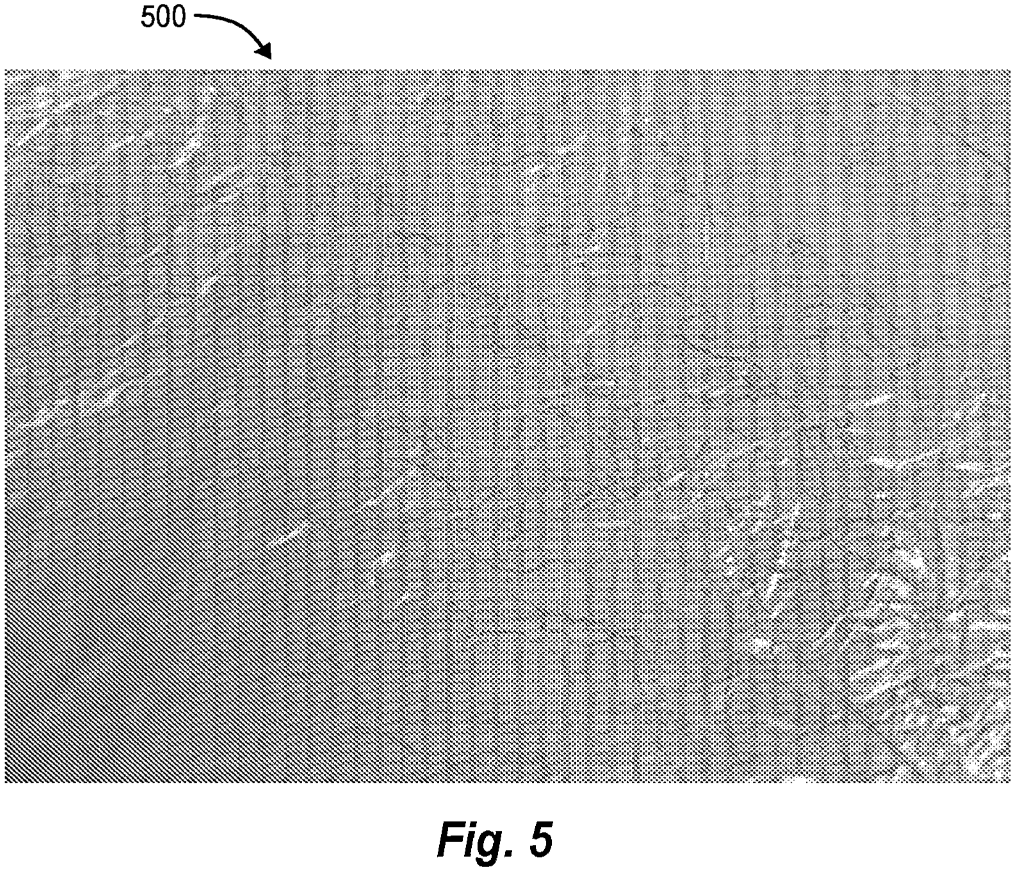
FIG. 5 illustrates a photograph of a plurality of fibers applied to a reinforced thermoplastic bag in accordance with one or more embodiments.

As discussed above, the plurality of fibers applied to a reinforced thermoplastic bag can be applied in a random form pattern. In accordance with one or more such embodiments, FIG. 5 illustrates a photograph 500 of a plurality of fibers applied to a reinforced thermoplastic bag. As shown in the photograph 500, the plurality of fibers is randomly applied (e.g., sprayed) onto a reinforced thermoplastic bag. That is, individual fibers of the plurality of fibers do not correspond to a predetermined structure relative to other fibers of the plurality of fibers. Indeed, the plurality of fibers appears similar to a melt blown non-woven comprising random fiber squiggles, random overlap of fibers, and random micro-areas without fibers.

Moreover, in this case, the photograph 500 depicts the plurality of fibers sandwiched in between layers at a top-of-bag region (e.g., the grab-zone) of a reinforced thermoplastic bag. Thus, when positioned in between layers, at least the outer layer is translucent to allow fiber visibility from an outside perspective. Additionally, the inner layer may be contrastively pigmented compared to the plurality of fibers. For example, the inner layer may be pigmented a light color, and the plurality of fibers may be pigmented a dark color to promote enhanced visibility of the plurality of fibers.

Figure 6:
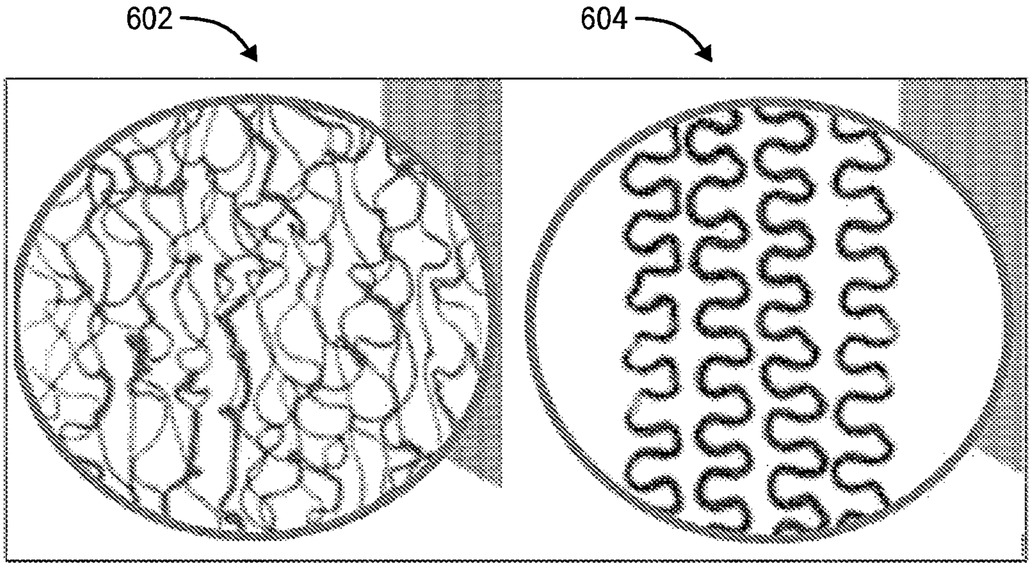
FIG. 6 illustrates example fiber patterns in accordance with one or more embodiments.

FIG. 6 illustrates example fiber patterns in accordance with one or more embodiments. In particular, FIG. 6 shows fiber patterns 602, 604. The fiber pattern 602 comprises fibers arranged in a random pattern. Indeed, fibers in the fiber pattern 602 comprises fibers that twist, spiral, bend, cross, intertwine, etc. in a random fashion with no predetermined structure. The fibers in the fiber pattern 602 may generally bond longitudinally (e.g., vertically or along a certain direction) according to a mode or direction of application to a film layer. However, the fibers in the fiber pattern 602 are not limited to a particular form.

In contrast, the fiber pattern 604 comprises fibers arranged in a predetermined structure (e.g., a zipper-like structure). In the fiber pattern 604, the fibers are spatially arranged relative to each other in a particular manner. For example, the fibers in the fiber pattern 604 may interlock with each other in a zipper-like fashion such that male features of respective fibers engage female features of the respective fibers. In other embodiments, the fiber pattern 604 may include myriad other structures, such as stacking structures, spiraling structures, etc.

It will be appreciated that the fiber patterns 602, 604 can be strategically implemented according to desired bag performance, fiber material properties, ease of manufacturing, and/or other suitable factors.

Figure 7:
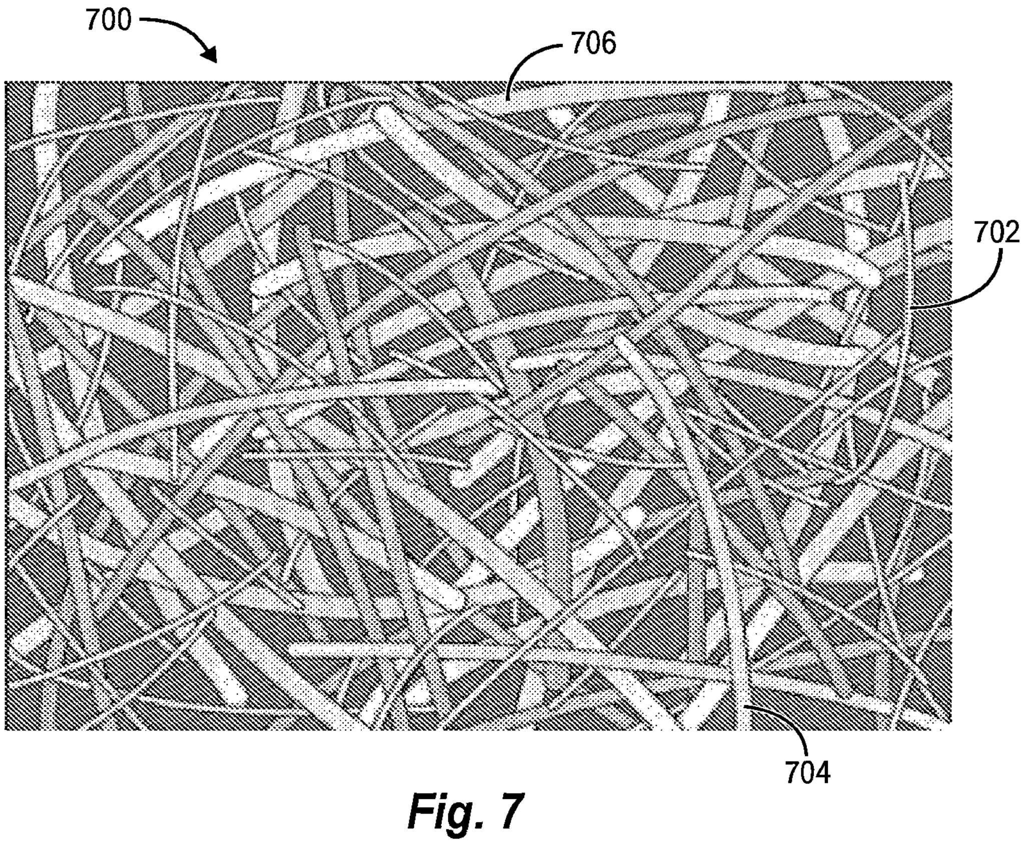
FIG. 7 illustrates a plurality of fibers comprising multiple unique fiber strands of different material in accordance with one or more embodiments.

As discussed above, the plurality of fibers can include mixed fiber materials to achieve certain performance and/or benefits. In accordance with one or more such embodiments, FIG. 7 illustrates a plurality of fibers 700 comprising multiple unique fiber strands of different material. As shown in FIG. 7, the plurality of fibers comprises a first fiber 702 corresponding to a first material, a second fiber 704 corresponding to a second material, and a third fiber 706 corresponding to a third material. The first material, the second material, and the third material differ from each other. Accordingly, FIG. 7 depicts an example of individual fiber strands that are composed of single unique materials but are applied along with other fibers comprising alternative materials to yield a reinforcing fiber region comprising multiple unique fiber strands.

By including multiple different materials, the plurality of fibers can, in combination, achieve certain mechanical advantages such as increased tensile strength from one fiber and increased adhesion from another fiber. Myriad other combinations or sets of fibers and corresponding performance benefits are contemplated within the scope of this disclosure. For example, one set of fibers may be provided for visibility purposes, while another set of fibers is provided for reclaim (sustainability) purposes, for odor prevention purposes, etc.

As just discussed with respect to FIG. 7, the plurality of fibers comprises various fibers for multiple different materials. However, the individual fibers correspond to a single material component. In contrast, certain implementations of the plurality of fibers include multi-component fiber strands, or a combination of single-component fiber strands and multi-component fiber strands. For example, FIG. 8 illustrates a plurality of fibers 800 comprising bi-component fiber strands in accordance with one or more embodiments.

Figure 8:
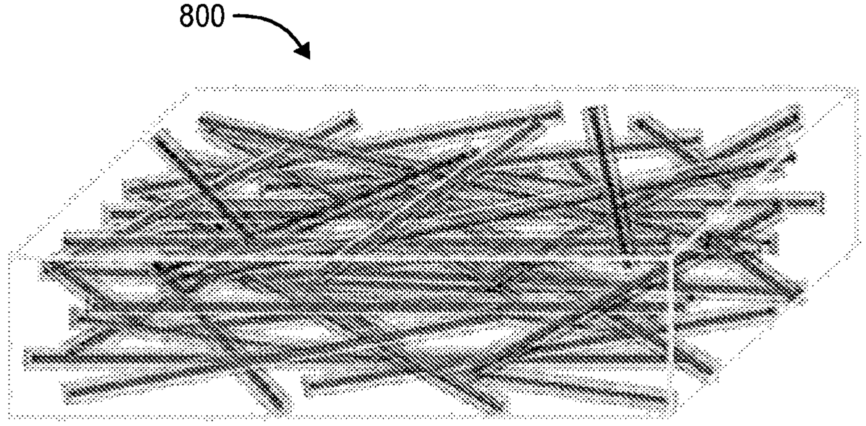
FIG. 8 illustrates a plurality of fibers comprising bi-component fiber strands in accordance with one or more embodiments.

As shown in FIG. 8, the plurality of fibers 800 comprises bi-component fibers to provide multiple material components in a single type of fiber. The bi-component fibers can be arranged in a variety of different ways as shown in FIG. 12. As one example arrangement of multiple fiber components, individual fibers of the plurality of fibers 800 comprise an inner core material encapsulated by an outer coating or sheath of material. For example, one or more fibers can comprise a LLDPE sheath and a HDPE core. In this fiber configuration, the lower melting point LLDPE sheath can soften at a given bonding temperature to bond to a thermoplastic film and/or other like fibers while the HPDE core can provide higher tensile strength characteristics.

It will be appreciated that the material components for the individual fiber strands can also induce or promote a particular layout of the plurality of fibers 800 when applied to a reinforced thermoplastic bag. Indeed, as shown in FIG. 8, the plurality of fibers 800 are more rigid and straight compared to the wiry, curly, or twisted randomness of fibers in the fiber pattern 602 discussed above in relation to FIG. 6. For instance, the inner core of the plurality of fibers 800 can be rigid—thereby inducing a random stacking structure at application time.

Figure 9:
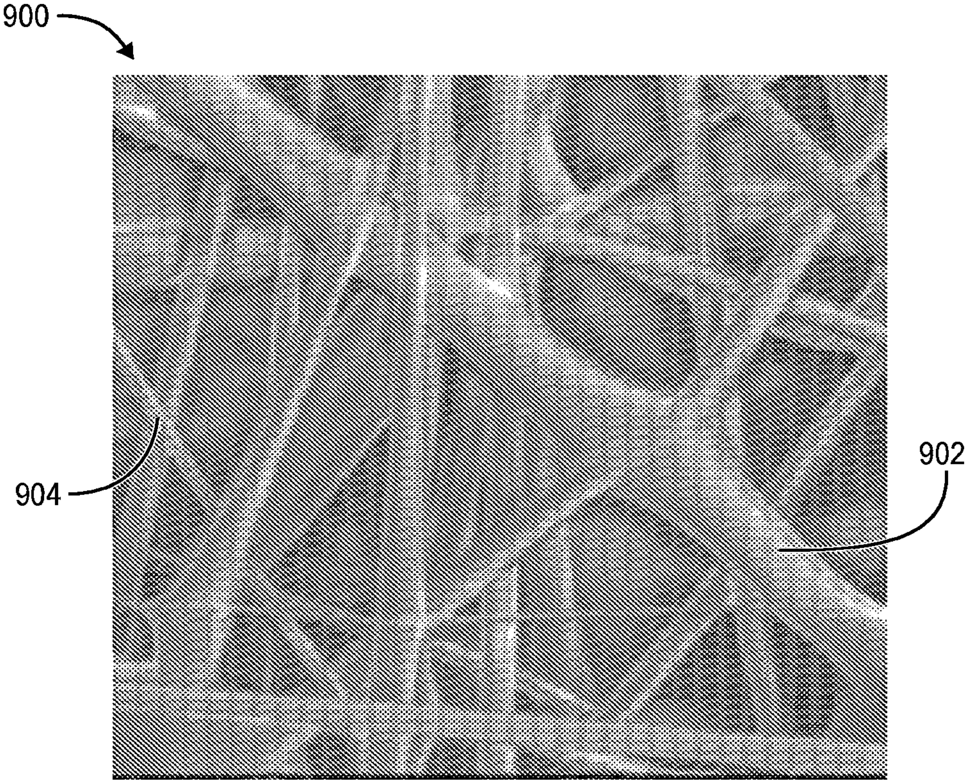
FIG. 9 illustrates a plurality of fibers comprising fibers of different sizes in accordance with one or more embodiments.

As discussed above, the plurality of fibers applied to a reinforced thermoplastic bag can include myriad different fibers and/or material components for corresponding advantages and/or functionality. Additionally or alternatively, the plurality of fibers can include varied fiber sizes. In accordance with one or more such embodiments, FIG. 9 illustrates a plurality of fibers 900 comprising fibers of different sizes. As shown, the plurality of fibers 900 comprises a thick fiber 902 with a larger diameter compared to a diameter for a thin fiber 904. In certain implementations, at least the thick fiber 902 corresponds to a fiber size (e.g., a fiber strand diameter) that is visible to consumers when applied to a reinforced thermoplastic bag. In one or more embodiments, the thin fiber 904 is also sized to be visible to consumers (albeit not required). Accordingly, the plurality of fibers 900 can include fibers of varied sizes—at least one of which is optimized to be visually distinctive and perceivable by consumers.

Figure 10:
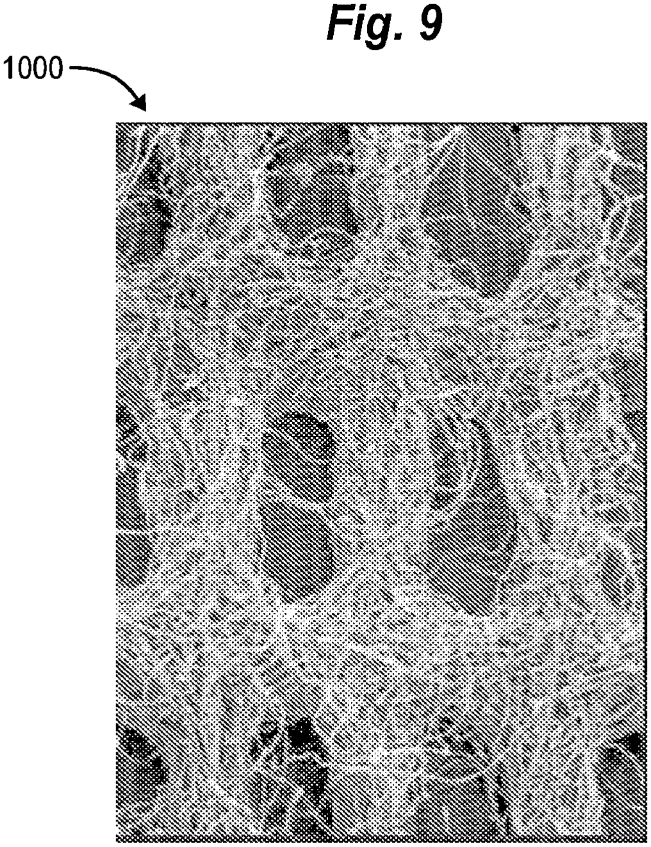
FIG. 10 illustrates a photograph depicting a plurality of fibers arranged in a density-varying configuration in accordance with one or more embodiments.

FIG. 10 illustrates a photograph depicting a plurality of fibers 1000 arranged in a density-varying configuration in accordance with one or more embodiments. In particular, FIG. 10 shows the plurality of fibers 1000 is arranged in a grid-like structure of high density and low density fiber areas. Specifically, the plurality of fibers 1000 corresponds to high density fibrous regions or paths that mesh together in an intersecting fashion. In between these high density fibrous regions are low density fiber regions or pockets of few or no fibers. In one or more embodiments, the density variation is optimized for visual distinction and/or film mechanical strength performance. For example, the low density fiber regions may be enlarged to increase visual distinction of the grid-like structure of the plurality of fibers 1000. As another example, the high density fiber regions may be increased to impart additional bag strength.

In certain implementations, the plurality of fibers 1000 is arranged in the grid-like structure shown in FIG. 10 using one or more different manufacturing approaches. As an example method, the plurality of fibers 1000 is arranged by implementing an embossing process or pinning process after the plurality of fibers 1000 is applied to a film surface.

It will be appreciated that density-varying configurations can include a wide variety of different implementations and/or corresponding manufacturing processes. Indeed, in certain embodiments, a density-varying configuration comprises a plurality of fibers of which the basis weight incrementally tapers (e.g., increases or decreases) in a certain direction across a film surface. For instance, a plurality of fibers may be lightly sprayed near the side edges of a bag (e.g., in the grab-zone) and sprayed with greater density towards the central region of the bag underneath and/or around a hem hole. The density gradient of fiber application can similarly be optimized for performance and/or visual distinction purposes.

As mentioned above, the plurality of fibers can optionally be discontinuously laminated to reinforce a thermoplastic bag and/or positionally anchor the plurality of fibers. For example, when fibers are applied as melt-extruded fibers directly between layers (such as a 2-ply film), subsequently performing bonding by heat/pressure or other bonding techniques can serve to provide discontinuous lamination between layers to enhance film mechanical strength. In accordance with one or more such embodiments, FIG. 11 illustrates a plurality of fibers 1100 having undergone localized heat and pressure as may be performed for discontinuous lamination to a bag layer (omitted for clarity).

Figure 11:
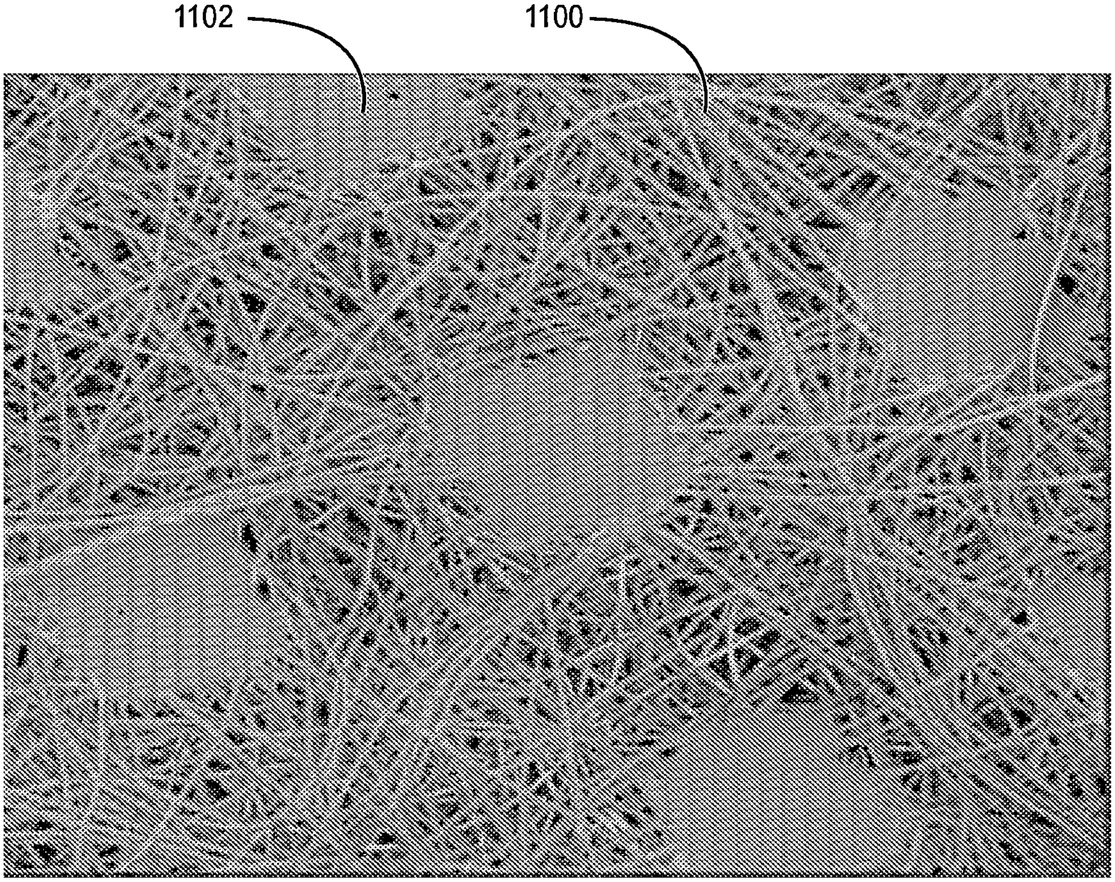
FIG. 11 illustrates a plurality of fibers having undergone localized heat and pressure as may be performed for discontinuous lamination to a bag layer in accordance with one or more embodiments.

As shown in FIG. 11, the plurality of fibers 1100 comprises bonding sites 1102 where the plurality of fibers 1100 is locally melted and compressed to form localized high density fiber regions. That is, the bonding sites 1102 correspond to specific locations of heat and pressure (e.g., smashing locations) where the plurality of fibers 1100 can bond to a film ply. In this manner, the plurality of fibers 1100 can be discontinuously laminated to a film to provide localized strength reinforcement.

It will also be appreciated that discontinuously laminating the plurality of fibers 1100 to a film layer can positionally anchor the plurality of fibers 1100 between plies. This is particularly useful in certain embodiments in which the plurality of fibers 1100 is extruded in the molten state but allowed to cool and solidify into a flexible state before it contacts the film layer such that no thermal bonding occurs. That is, the plurality of fibers 1100 may be mechanically trapped (e.g., encapsulated) between layers, but not bonded to a sidewall layer. In such implementations, the bonding sites 1102 correspond to a plurality of non-continuous bonds that positionally anchor the plurality of fibers 1100 between layers of a thermoplastic sidewall. In another instance, anchoring the plurality of fibers 1100 via discontinuous lamination is useful when the plurality of fibers is chemically incompatible with the film layer such the plurality of fibers lacks the chemical affinity to adhere to the film layer (even in the molten state). By positionally anchoring the plurality of fibers 1100, the reinforced thermoplastic bag can provide the desired performance and consumer experience.

The non-continuous bonds at the bonding sites 1102 can be provided in one or more different ways. For example, the plurality of non-continuous bonds may include a plurality of discontinuous adhesive bonds. In alternative implementations, the plurality of non-continuous bonds can comprise ultrasonic bonds, pressure bonds (i.e., bonds formed from one or more of ring rolling, SELFing, or embossing), heat seals, or a combination of pressure and tackifying agents in one or more of the films. It will be appreciated that the plurality of non-continuous bonds can have additional or alternative positional configurations or design patterns than illustrated according to FIG. 11.

In one or more implementations, the plurality of non-continuous bonds can have a bond strength that is less than a weakest tear resistance of each of the reinforced thermoplastic bag and the plurality of fibers 1100. In this manner, the plurality of non-continuous bonds can be designed to fail prior to failing of the reinforced thermoplastic bag or the plurality of fibers 1100. Indeed, one or more implementations include the plurality of non-continuous bonds that release just prior to any localized tearing of the reinforced thermoplastic bag or the plurality of fibers 1100. In particular, the plurality of non-continuous bonds between the reinforced thermoplastic bag and the plurality of fibers 1100 can act to first absorb forces via breaking of the plurality of non-continuous bonds prior to allowing that same force to cause failure of the reinforced thermoplastic bag or the plurality of fibers 1100. Such action can provide increased strength to the reinforced thermoplastic bag.

This is beneficial as it has been found that thermoplastic films often exhibit strength characteristics that are approximately equal to the strength of the weakest layer. Providing relatively weak bonding between the reinforced thermoplastic bag and the plurality of fibers 1100 has surprisingly been found to greatly increase the strength provided by the plurality of fibers 1100. As more explicitly covered in U.S. patent application Ser. No. 12/947,025 filed Nov. 16, 2010, and entitled DISCONTINUOUSLY LAMINATED FILM, incorporated by reference herein, the MD and TD tear values of non-continuously laminated films in accordance with one or more implementations can exhibit significantly improved strength properties, despite a reduced gauge. In particular, the individual values for the Dynatup, MD tear resistance, and TD tear resistance properties in non-continuously laminated films of one or more implementations are unexpectedly higher than the sum of the individual layers. Thus, the non-continuous lamination of the reinforced thermoplastic bag and the plurality of fibers 1100 can provide a synergistic effect.

More specifically, the TD tear resistance of the non-continuously laminated films can be greater than a sum of the TD tear resistance of the individual layers. Similarly, the MD tear resistance of the non-continuously laminated films can be greater than a sum of the MD tear resistance of the individual layers. Along related lines, the Dynatup peak load of the non-continuously laminated films can be greater than a sum of a Dynatup peak load of the individual layers. Thus, the non-continuously laminated films can provide a synergistic effect. In addition to the foregoing, one or more implementations of a non-continuously laminated plurality of fibers 130 can allow for a reduction in basis weight (gauge by weight) as much as 50% in such areas of the reinforced thermoplastic bag and still provide enhanced strength parameters.

As discussed above, the plurality of fibers can include multi-component fibers to provide different functionality and/or performance advantages. In accordance with one or more such embodiments, FIG. 12 illustrates a table 1200 indicating various example configurations of hot melt bi-component spray nozzle configurations that can produce corresponding fiber cross-sections of certain material compositions. As shown in the table 1200, columns 1-12 indicate a certain fiber type, various material combinations, a measure of linear density or final titer measured in grams per 10,000 meters of fiber (dtex), and a ratio percentage of example materials. The values provided in the table 1200 may be modified for different fiber colors, fiber materials, dtex, cross-sectional profiles, product lines, performance advantages, and/or end uses.

As shown for the table 1200, column 1 indicates a spray nozzle configuration for a core/sheath fiber cross-section, and column 2 indicates a spray nozzle configuration for an eccentric core/sheath fiber cross-section. Columns 3-12 similarly indicate spray nozzle configurations for fiber cross-sections of side by side full, side by side hollow, side by side hollow eccentric, orange type with hollow center and 16 segments, orange type with 16 segments, striped fibers, conductive fibers, island in the sea, bicomponent profile, and mixed fibers.

Figure 13:
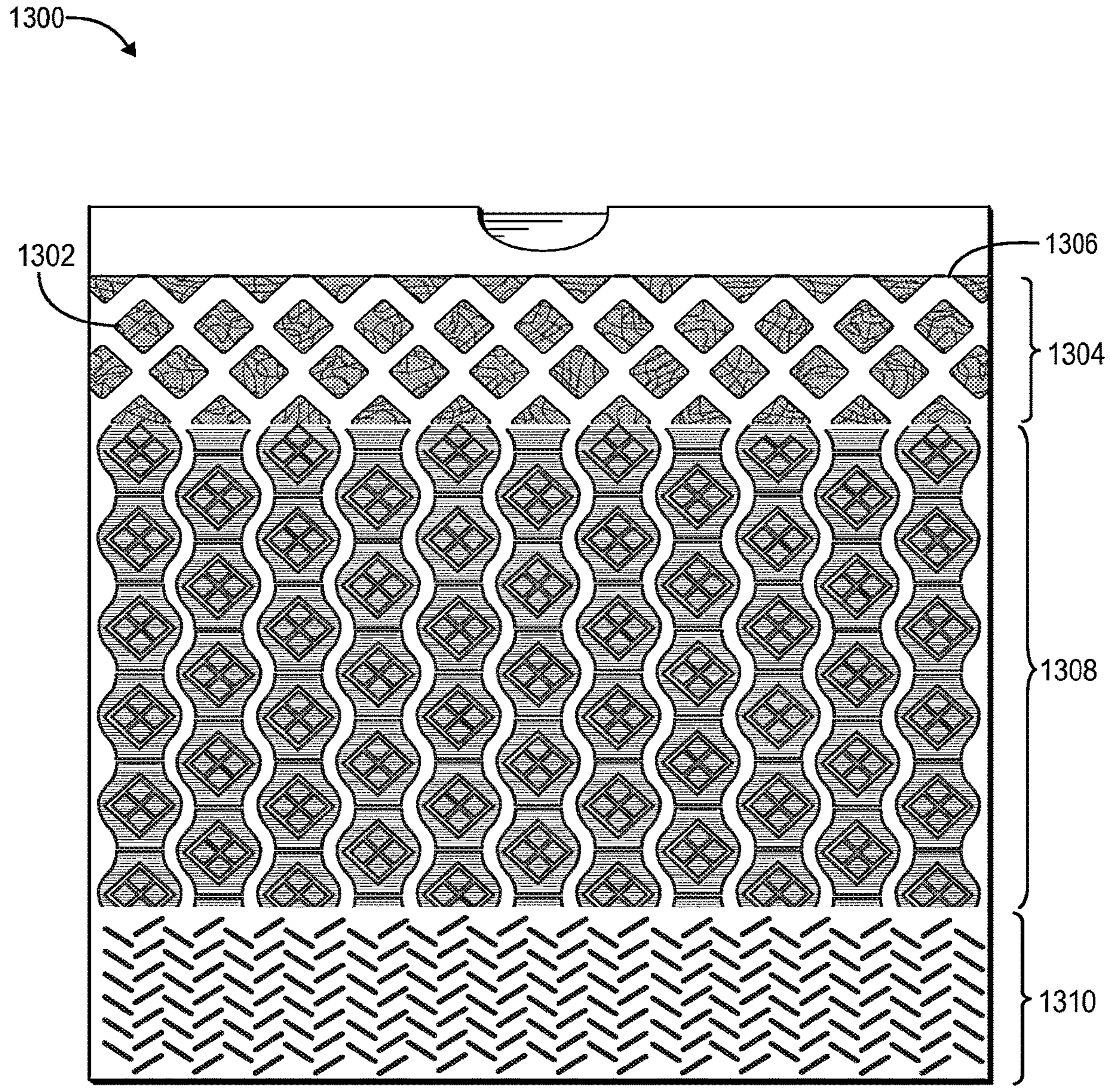
FIG. 13 illustrates a front view of a reinforced thermoplastic bag in accordance with one or more embodiments.

FIG. 13 illustrates a front view of a reinforced thermoplastic bag 1300 in accordance with one or more embodiments. In particular, a grab-zone 1304 below a hem seal 1306 includes a pattern 1302 of contact areas that have a gray fibrous appearance created by bringing the dark pigmentation of an inner layer into intimate contact with a translucent outer layer. The plurality of fibers sandwiched between the inner and outer layer are also visible at the contact areas. FIG. 13 further illustrates that a bottom region 1310 of the reinforced thermoplastic bag 1300 can include a region of contact areas. As shown, the contact areas of the bottom region 1310 can differ from the contact areas of the grab-zone 1304.

Contact areas in the grab-zone 1304 and the bottom region 1310 can provide various performance and/or consumer advantages. For example, the contact areas of the pattern 1302 in the grab-zone 1304 can help reinforce the top-of-bag due to increased stiffness provided by the contact areas. In turn, this reinforcement can help to reduce tearing or other damage by stresses/strain from grasping fingers (e.g., during a grabbing motion to lift or carry) applied to the grab-zone 1304. Additionally, the increased stiffness can provide a tactile feel that connotes strength to a user grasping the grab-zone 1304. Thus, by positioning the contact areas in the grab-zone 1304 (a high-touch area), the contact areas provide tactile cues to the consumer about the strength and quality of the reinforced thermoplastic bag. More specifically, the contact areas can comprise contact areas as described in International Application No. PCT/US2020/24143, filed on Mar. 23, 2020 and entitled: MULTI-FILM THERMOPLASTIC STRUCTURES AND BAGS HAVING VISUALLY-DISTINCT CONTACT AREAS AND METHODS OF MAKING THE SAME, which claims the benefit of and priority to U.S. Provisional Application No. 62/825,520, filed Mar. 28, 2019 and entitled: MULTI-FILM THERMOPLASTIC STRUCTURES AND BAGS HAVING VISUALLY-DISTINCT CONTACT AREAS AND METHODS OF MAKING THE SAME, the contents of the these two patent applications are hereby incorporated by reference in their entirety.

In certain embodiments, contact areas can be positioned adjacent to separation areas. These separation areas can include loft formations as another example tactile feature that provides consumers a tactile sensation of increased ply thickness or sidewall gauge (albeit the actual gauge or thickness may not be increased). Indeed, this tactile sensation from the loft formations in the separation areas can provide a perceived increase in reinforcement. For example, trapped air inside the separation areas can cause the loft formations or air bubbles in between the contact areas to provide a tactile response of flexible resistance against grasping fingers in contact with the grab-zone 1304. In these or other embodiments, the loft formations in the separation areas may be formed by one or more operations (e.g., air entrapment, applying ply tensioning differentials etc.).

Additionally shown in FIG. 13, the reinforced thermoplastic bag 1300 includes a middle region 1308 extending from below the grab-zone 1304 a distance toward the bottom edge of the reinforced thermoplastic bag 1300. The middle region 1308 includes a plurality of deformations (e.g., SELFing). As shown, the middle region 1308 includes a pattern of elements that includes diamonds and wavy lines. Additionally, the pattern of elements can take up any percentage of the middle region 1308. For example, the pattern of elements in the middle region 1308 can be a SELFing or ring rolling pattern. In particular, the middle region 1308 includes a SELFing pattern of bulbous areas with nested diamonds. Wavy land areas separate the SELFing patterns. In some implementations, the wavy land areas may be contact areas in addition to the contact areas in the grab-zone 1304. The SELFing pattern of the middle region 1308 can be formed using the techniques described in International Patent Application No. PCT/US2018/058998 filed on May 16, 2019, and entitled "THERMOPLASTIC FILMS AND BAGS WITH COMPLEX STRETCH PATTERNS AND METHODS OF MAKING THE SAME," hereby incorporated by reference in its entirety.

One or more implementations of the present invention can also include methods of forming reinforced thermoplastic bags with a plurality of fibers. In accordance with one or more embodiments, a process 1400 in FIG. 14 and the accompanying description describe one or more embodiments of such methods. Of course, as a preliminary matter, one of ordinary skill in the art will recognize that the methods explained in detail herein can be modified. For example, various acts of the method described can be omitted or expanded, additional acts can be included, and the order of the various acts of the method described can be altered as desired.

Figure 14:
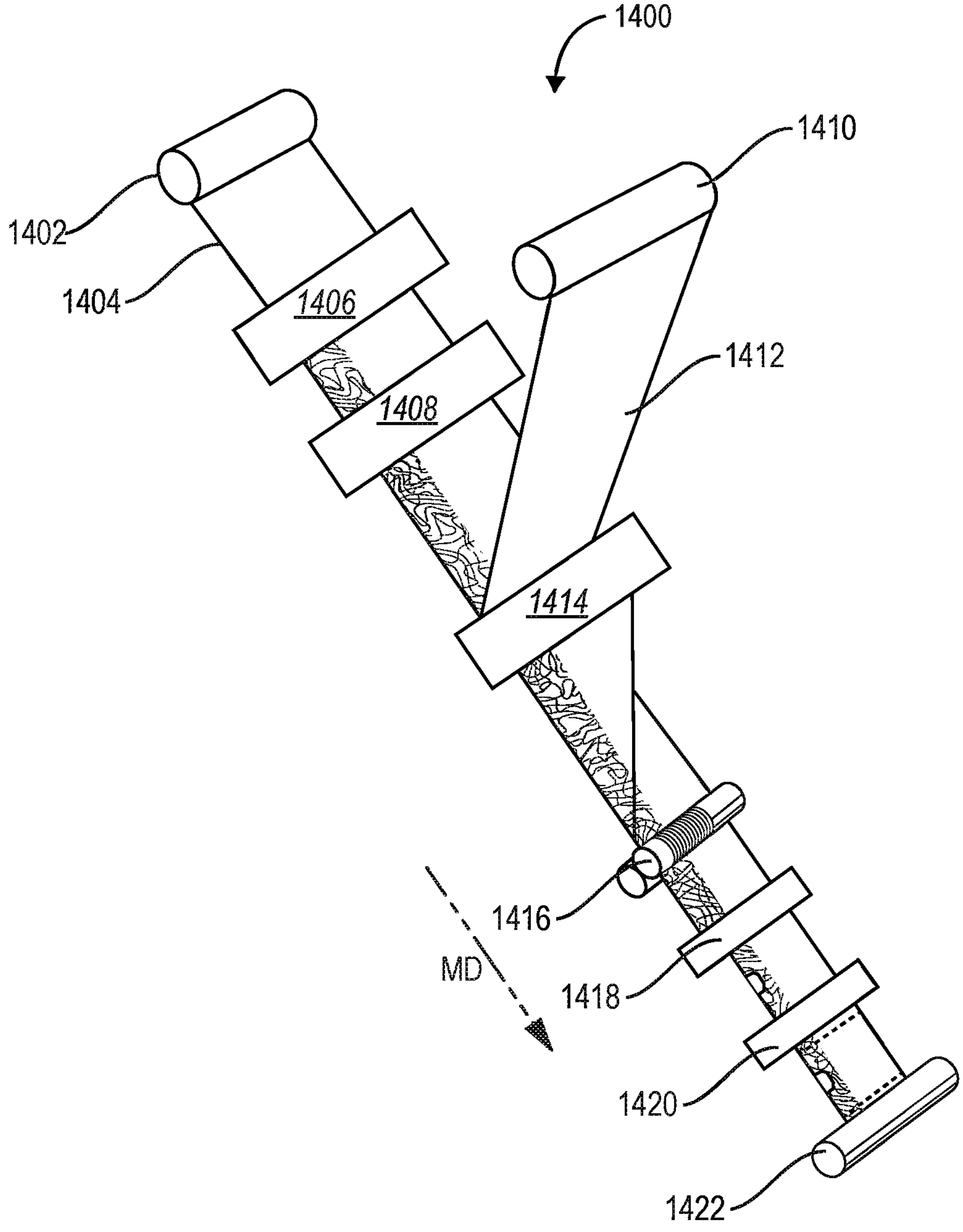
FIG. 14 illustrates an example manufacturing process for forming a fiber reinforced thermoplastic bag in accordance with one or more embodiments.

As shown for the process 1400 in FIG. 14, production may begin by unwinding a first continuous web or film 1404 of a first thermoplastic material from a roll 1402 and advancing the film 1404 along a machine direction. The film 1404 may have an initial height that is perpendicular to the machine direction. In other manufacturing environments, the film 1404 may be provided in other forms or even extruded directly from a thermoplastic forming process.

At operation 1406, a plurality of fibers is applied to the film 1404. In particular embodiments, the operation 1406 entails applying a plurality of fibers utilizing one or more methods described below in relation to FIGS. 15A-15D. For example, the operation 1406 comprises applying melt-blown fiber extrusions, applying spun bond, applying a hot melt spray of fibers onto the film 1404, or carding the fibers onto the film 1414. In certain implementations, the operation 1406 includes utilizing one or more spray nozzles discussed above in relation to FIG. 12 for applying bi-component fibers. Additionally, the operation 1406 comprises applying the plurality of fibers in a particular manner (random or patternized) and at a particular location on the film 1404 that will correspond to at least one of a grab-zone or a hem channel.

In one or more embodiments, the plurality of fibers bonds (e.g., a peelable bond or a thermal bond) to the film 1404 at the operation 1406. In alternative embodiments however, the plurality of fibers is applied in a cooled, non-molten state such that no bonding occurs. Similarly, in certain implementations, the plurality of fibers is chemically unable to bond to the film 1404.

Optionally, at an operation 1408, the plurality of fibers is cooled. For example, the plurality of fibers may be air cooled via one or more fans or air nozzles providing a cooling effect to the plurality of fibers just applied at the operation 1406. In other embodiments, the plurality of fibers may be sprayed with a cooling agent (e.g., liquid nitrogen). In still further implementations, the plurality of fibers is cooled using a chill roll. In this manner, the plurality of fibers does not thermally bond with a film 1412 subsequently applied onto the film 1404 and the plurality of fibers. In certain embodiments omitting the operation 1408, the plurality of fibers may, but not necessarily, bond to the film 1412 subsequently applied onto the film 1404 and the plurality of fibers.

As shown in FIG. 14, the film 1412 is unwound from a roll 1410 and applied to the film 1404 and the plurality of fibers. For clarity of illustration in FIG. 14, it will be appreciated that the film 1412 overlaying the plurality of fibers is translucent such that the plurality of fibers remains visible. With the addition of the film 1412, the process 1400 can produce a 2-ply bag. Further, the film 1412 mechanically entraps the plurality of fibers between the film 1404 and the film 1412. In one or more embodiments, trapping the plurality of fibers can help prevent cross-contamination of fibers into other manufacturing operations.

Subsequently, at the folding operation 1414, the films 1404, 1412 are folded in half to form a bottom fold and both sidewalls of a reinforced thermoplastic bag. In turn, the films 1404, 1412 as folded can be fed into rollers 1416 for incrementally stretching at least a portion of the films 1404, 1412 by performing one or more of MD ring rolling, TD ring rolling, SELFing, embossing, pinning, forming contact/loft areas, chemical bonding, adhesive bonding, thermal bonding, ultrasonic bonding, or other methods. In one or more implementations, the rollers 1416 are intermeshing rollers comprising a particular design to impart a bonding pattern and/or interdigitate the plurality of fibers with the films 1404, 1412 (e.g., as described in relation to the foregoing figures). To facilitate such a bonding pattern, the rollers 1416 may be forced or directed against each other by, for example, hydraulic actuators. The pressure at which the rollers 1416 are pressed together may be in a first range from 30 PSI (2.04 atm) to 100 PSI (6.8 atm), a second range from 60 PSI (4.08 atm) to 90 PSI (6.12 atm), and a third range from 75 PSI (5.10 atm) to 85 PSI (5.78 atm). In one or more implementations, the pressure may be about 80 PSI (5.44 atm).

At operation 1418, a hem fold is created by folding a top edge for each sidewall onto corresponding interior surfaces of the sidewalls, thereby encasing a draw tape inserted at operation 1418. Accordingly, the height of the films 1404, 1412 is further reduced as a result of the hem-folding. Moreover, in one or more implementations, the plurality of fibers is integrated in the hem folding of operation 1418. This integration allows the plurality of fibers to provide reinforcement to the hem-channel, particularly where the plurality of fibers is also folded over (e.g., on top of the draw tape and/or one or more sidewall layers). In these or other embodiments, the formed hem is secured in place at operation 1418 by producing a hem seal that affixes the top edges of the respective sidewalls to the interior surfaces via heat bars. Additionally, as mentioned above, the plurality of fibers can be secured at the hem seal (albeit in other embodiments positioned exclusively below the hem seal). In one or more embodiments, the operation 1418 further comprises forming a hem hole for accessing a draw tape within the hem channel.

At an operation 1420, the side seals are created perpendicular to the machine direction in a same or similar manner as done for producing the hem seal. In particular, the side seals join together the sidewalls of the films 1404, 1412. In one or more implementations, the side seals secure the plurality of fibers to the films 1404, 1412 in addition to, or alternatively to, the hem seal. Of course, in other embodiments, the plurality of fibers is not secured at the side seals.

Subsequently, the films 1404, 1412 (now formed into discrete, reinforced thermoplastic bags) can be wound into a roll 1422 for packaging and distribution. In these or other embodiments, the reinforced thermoplastic bags can be perforated (e.g., via a perforating device) to facilitate easier separation of the reinforced thermoplastic bags. Additionally or alternatively, the reinforced thermoplastic bag can be completely separated by a cutting device and wound in an interleaved fashion into the roll 1422 for packaging and distribution.

Modifications, additions, or omissions may be made to the embodiments illustrated and described in relation to the figures without departing from the scope of the present disclosure. For example, in one or more embodiments, the process 1400 may be modified such that a plurality of fibers corresponds to a particular configuration different from what is illustrated in FIG. 14. Indeed, the plurality of fibers may be provided exclusively within a grab-zone below a hem seal. Alternatively, the plurality of fibers may be concentrated around a hem hole or at a central region of a grab-zone away from side seals. As another example modification to the process 1400, only a single film or web may be used, and/or the hem folding operation may be omitted for reinforced thermoplastic bags without a drawstring. In yet another example modification, the process 1400 includes a reclaim operation of feeding film scrap into the fiber extrusion or fiber melting process at the operation 1406.

Figure 15A:
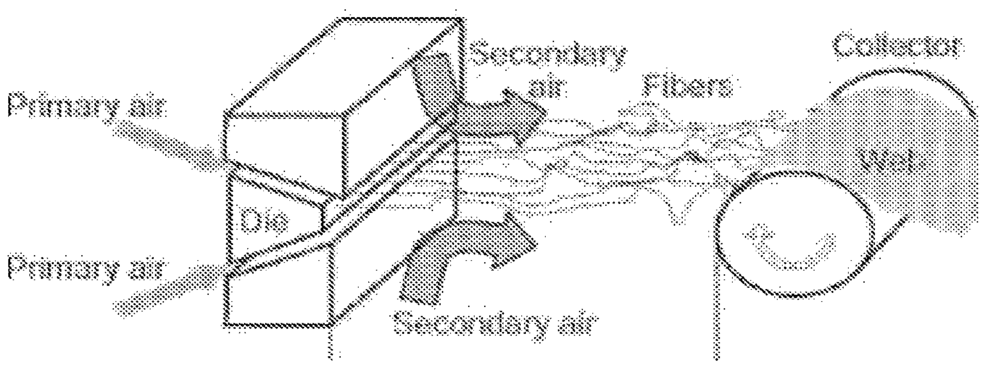
FIGS. 15A-15D illustrate example methods of providing a plurality of fibers to a reinforced thermoplastic bag in accordance with one or more embodiments.

FIGS. 15A-15D illustrate example methods of providing a plurality of fibers to a reinforced thermoplastic bag in accordance with one or more embodiments. In particular, FIG. 15A shows a method of applying a melt-blown fiber extrusion onto a film. In this approach to fiber application, hot air (primary air) proceeds around die edges and converges with fibers proceeding out of the die tip. Air knifes adjacent to the die then redirect or reflow the primary air—thereby creating a directional airflow that, when combined with secondary cooling air, blows the fibers onto the film.

Figure 15B:
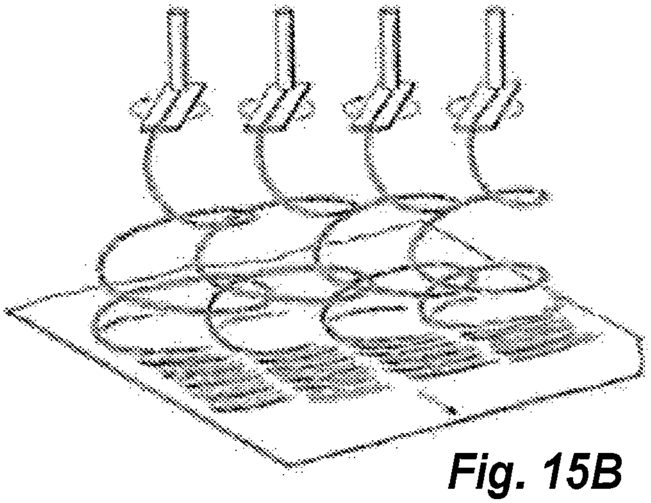

FIG. 15B shows a spun-bond method of applying fibers to a film. In the spun-bond method, molten polymer is forced by spin pumps through a spinneret having one or more holes. Air ducts below the spinneret block supply cooling air to cool the spun filaments as they proceed from the spinneret block towards a film.

Figure 15C:
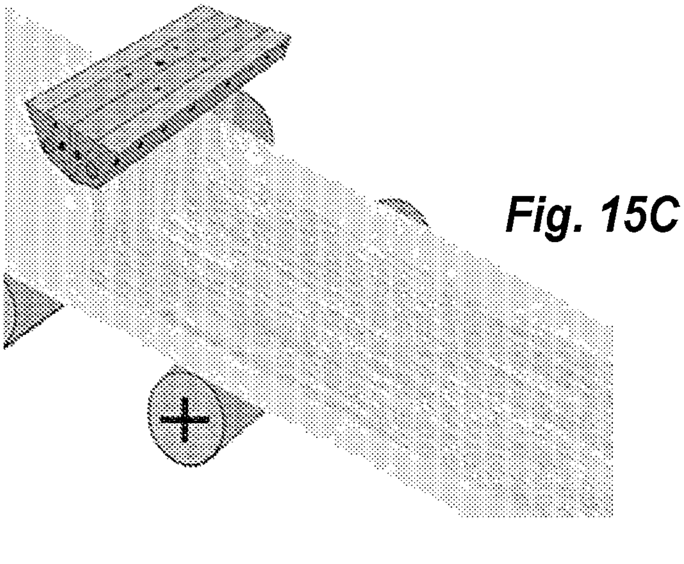

FIG. 15C shows a hot-melt spray method of applying fibers to a film. In the hot-melt spray method, hot melt material (e.g., hot-melt adhesive) is sprayed out via one or more spray nozzles. In one or more embodiments, the hot-melt spray method can apply uniform hot melt coverage, consistent placement, and clean cutoff. In addition, spray nozzles can provide a variety of spray patterns (e.g., spiral shapes, dome shapes, etc.) as may be desired for fiber coverage and/or application. Similarly, as discussed above in relation to FIG. 12, the spray nozzles can provide various fiber component profiles for different types of fibers.

Regardless of implementation, it will be appreciated that application of the plurality of fibers can include various manufacturing equipment. For example, implementation of the fiber application methods shown in FIGS. 15A-15C may include implementing a standard converting industry hot melt adhesive supply unit, an adhesive application unit, a material supply unit (e.g., a polymer extrusion unit), and/or various nozzle types (e.g., as described above in relation to FIG. 12). In certain embodiments, application units can include nonwoven industry spinnerets.

Figure 15D:
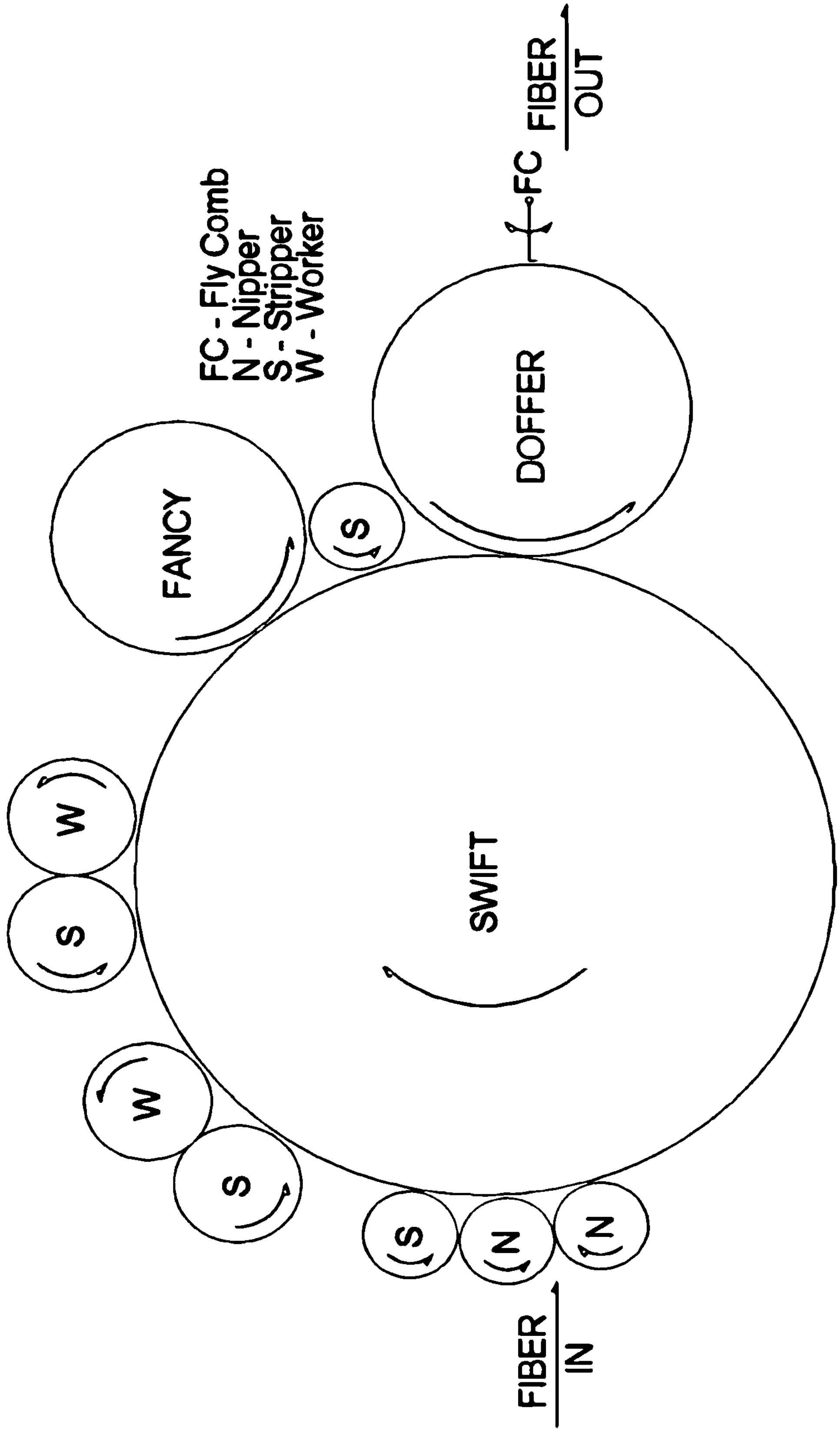

In addition to the forgoing methods, in one or more implementations, a carding process is used to provide a plurality of fibers to a reinforced thermoplastic bag. In particular, a carding process may be advantageous when utilizing natural fibers that are not extruded or melt-bondable. More specifically, in one or more implementations, a drum carder or a cottage carder is used to apply the plurality of fibers to a reinforced thermoplastic bag. For instance, FIG. 15D illustrates a carding process that utilizes a cottage carder to apply a plurality of fibers. In particular, Fiber are feed into the carder and through a pair of nipper rollers that in turn feed the fibers onto the swift. As the fibers travel around the swift, many of the fibers are straightened. Fibers that are not straightened are picked up by a worker and carried to a paired stripper. Relative to the surface speed of the swift, the worker turns slower, which reverses the picked up fibers. The stripper turns at a higher speed than the worker and pulls fibers from the worker and passes them back onto the swift. The stripper's slower relative surface speed compared to the swift allows the swift to pull the fibers from the stripper for additional straightening. Straightened fibers are carried by the swift to the fancy. The fancy may have a card cloth designed to engage with a card cloth of the swift so that the fibers are lifted and to carried by the swift to the doffer. In one or more implementations, the fancy and the swift are the only rollers in the shown carding process that actually touch. The doffer removes the fibers from the swift and carries them to the fly comb where they are stripped from the doffer. A fine web of more or less parallel fibers, exits the carder at the fly comb by gravity or other mechanical means for application to a reinforced thermoplastic bag (or for storage for later application).

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases “at least one” and “one or more” to introduce claim recitations. However, the use of such phrases should not be construed to imply that the introduction of a claim recitation by the indefinite articles “a” or “an” limits any particular claim containing such introduced claim recitation to embodiments containing only one such recitation, even when the same claim includes the introductory phrases “one or more” or “at least one” and indefinite articles such as “a” or “an” (e.g., “a” and/or “an” should be interpreted to mean “at least one” or “one or more”); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of “two recitations,” without other modifiers, means at least two recitations, or two or more recitations). Furthermore, in those instances where a convention analogous to “at least one of A, B, and C, etc.” or “one or more of A, B, and C, etc.” is used, in general such a construction is intended to include A alone, B alone, C alone, A and B together, A and C together, B and C together, or A, B, and C together, etc. For example, the use of the term “and/or” is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase “A or B” should be understood to include the possibilities of “A” or “B” or “A and B.”

However, the use of such phrases should not be construed to imply that the introduction of a claim recitation by the indefinite articles “a” or “an” limits any particular claim containing such introduced claim recitation to embodiments containing only one such recitation, even when the same claim includes the introductory phrases “one or more” or “at least one” and indefinite articles such as “a” or “an” (e.g., “a” and/or “an” should be interpreted to mean “at least one” or “one or more”); the same holds true for the use of definite articles used to introduce claim recitations.

Additionally, the use of the terms “first,” “second,” “third,” etc., are not necessarily used herein to connote a specific order or number of elements. Generally, the terms “first,” “second,” “third,” etc., are used to distinguish between different elements as generic identifiers. Absence a showing that the terms “first,” “second,” “third,” etc., connote a specific order, these terms should not be understood to connote a specific order. Furthermore, absence a showing that the terms “first,” “second,” “third,” etc., connote a specific number of elements, these terms should not be understood to connote a specific number of elements. For example, a first widget may be described as having a first side and a second widget may be described as having a second side. The use of the term “second side” with respect to the second widget may be to distinguish such side of the second widget from the “first side” of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A reinforced thermoplastic bag comprising:

a first layer of a thermoplastic material comprising a first side edge and an opposing second side edge, a top edge, and an opposing bottom edge;

a second layer of a thermoplastic material comprising a first side edge and an opposing second side edge, a top edge, and an opposing bottom edge, wherein the first layer and the second layer form a sidewall of the reinforced thermoplastic bag;

a hem seal;

a hem channel comprising a fold-over of the top edge of the first layer and the top edge of the second layer, the fold-over being secured to an inner surface of the sidewall by the hem seal to form a hem;

a hem hole that provides access to a draw tape disposed within the hem channel; and a plurality of polymer fibers comprising a reclaimable polymer material secured to the first layer, wherein the plurality of polymer fibers:

is positioned between the first layer and the second layer;

extends from the hem hole a first distance toward the first side edge of the first layer and extends from the hem hole the first distance toward the opposing second side edge of the first layer, the first distance being less than a second distance from the hem hole to the first side edge of the first layer or the opposing second side edge of the first layer; and is positioned across the first layer from at least the hem seal an additional distance towards the opposing bottom edge of the first layer.

2. The reinforced thermoplastic bag of claim 1, wherein the plurality of polymer fibers starts at the hem seal and extends the additional distance towards the opposing bottom edge.

3. The reinforced thermoplastic bag of claim 1, wherein the plurality of polymer fibers is positioned between the first layer and the second layer within the hem.

4. The reinforced thermoplastic bag of claim 1, wherein the plurality of polymer fibers is further secured to a portion of the first layer forming a hem skirt.

5. A multi-layer reinforced thermoplastic bag comprising:

a first thermoplastic bag comprising first and second opposing sidewalls joined together along a first side edge, an opposite second side edge, an open first top edge, and a closed first bottom edge;

a second thermoplastic bag positioned within the first thermoplastic bag, the second thermoplastic bag comprising third and fourth opposing sidewalls joined together along a third side edge, an opposite fourth side edge, an open second top edge, and a closed second bottom edge, wherein the first thermoplastic bag and the second thermoplastic bag each comprise a grab-zone extending from the first and third side edges to the opposite second and fourth side edges and from the first and second open top edges toward the first and second closed bottom edges; and a plurality of reinforcing polymer fibers comprising a reclaimable polymer material secured to at least one of the first thermoplastic bag or the second thermoplastic bag and positioned across a portion of the grab-zone of one or both of the first thermoplastic bag or the second thermoplastic bag, wherein the plurality of reinforcing polymer fibers comprises a first set of polymer fibers of a first diameter and a second set of polymer fibers of a second diameter larger than the first diameter, at least the second set of polymer fibers being visible at the grab-zone.

6. The multi-layer reinforced thermoplastic bag of claim 5, wherein the plurality of reinforcing polymer fibers is secured to the first thermoplastic bag in a first region in a first density and secured to a second region in a second density, the first density being greater than the second density.

7. The multi-layer reinforced thermoplastic bag of claim 5, wherein the plurality of reinforcing polymer fibers forms a random fiber structure.

8. The multi-layer reinforced thermoplastic bag of claim 5, wherein the plurality of reinforcing polymer fibers comprises a first set of polymer fibers corresponding to a first material and a second set of polymer fibers corresponding to a second material that differs from the first material.

9. The multi-layer reinforced thermoplastic bag of claim 5, wherein one or more fibers of the plurality of reinforcing polymer fibers comprise multi-component fiber strands.

10. The multi-layer reinforced thermoplastic bag of claim 5, wherein the plurality of reinforcing polymer fibers is secured to the first thermoplastic bag via at least one of:

peelable bonds such that the plurality of reinforcing polymer fibers is removably tacked onto the first thermoplastic bag; or fused bonds such that the plurality of reinforcing polymer fibers is melt-extruded and thermally welded onto the first thermoplastic bag.

11. A reinforced thermoplastic bag comprising:

first and second sidewalls comprising a thermoplastic material, the first and second sidewalls comprising a first side edge, a second side edge opposite the first side edge, a bottom edge, and an opening along respective top edges;

a first side seal extending along the first side edge;

a second side seal extending along the second side edge; and a plurality of polymer fibers comprising a reclaimable material secured to the thermoplastic material of the first and second sidewalls, wherein the plurality of polymer fibers at least partially spans a region extending between the first side edge and the second side edge and from the respective top edges a distance towards the bottom edge, and wherein the plurality of polymer fibers is secured to the first and second sidewalls in a first region in a first density and secured to a second region in a second density, the first density being greater than the second density.

12. The reinforced thermoplastic bag of claim 11, wherein the plurality of polymer fibers starts at the opening and extends an additional distance towards the bottom edge.

13. The reinforced thermoplastic bag of claim 11, wherein the plurality of polymer fibers forms a random fiber structure.

14. The reinforced thermoplastic bag of claim 11, wherein the plurality of polymer fibers comprises a first set of polymer fibers corresponding to a first material and a second set of polymer fibers corresponding to a second material that differs from the first material.

15. The reinforced thermoplastic bag of claim 11, further comprising a hem channel comprising a fold-over of the respective top edges, the fold-over being secured to an inner surface of the first and second sidewalls by a hem seal to form a hem.

16. The reinforced thermoplastic bag of claim 15, wherein the plurality of polymer fibers starts at the hem seal and extends an additional distance towards the bottom edge.

17. The reinforced thermoplastic bag of claim 15, further comprising a hem hole for accessing a draw tape disposed within the hem channel, wherein:

the plurality of polymer fibers extends from the hem hole a first distance toward the first side edge; and the plurality of polymer fibers extends from the hem hole the first distance toward the second side edge, the first distance being less than a distance from the hem hole to the first side edge or the second side edge.

* * * * *